US012577433B2

(12) United States Patent
Gurung et al.

(10) Patent No.: US 12,577,433 B2
(45) Date of Patent: Mar. 17, 2026

(54) SPRAYABLE ADHESIVE COMPOSITIONS AND RELATED SYSTEMS AND RELATED METHODS

(71) Applicant: BMIC LLC, Dallas, TX (US)

(72) Inventors: Laxman Gurung, Parsippany, NJ (US); Lingtao Yu, Summit, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/067,583

(22) Filed: Feb. 28, 2025

(65) Prior Publication Data

US 2025/0277137 A1 Sep. 4, 2025

Related U.S. Application Data

(60) Provisional application No. 63/560,420, filed on Mar. 1, 2024.

(51) Int. Cl.
| | |
|---|---|
| *C09J 5/00* | (2006.01) |
| *C09J 9/00* | (2006.01) |
| *C09J 11/08* | (2006.01) |

(52) U.S. Cl.
CPC . *C09J 5/00* (2013.01); *C09J 9/00* (2013.01); *C09J 11/08* (2013.01); *C09J 2203/346* (2020.08); *C09J 2301/408* (2020.08)

(58) Field of Classification Search
CPC ........... C09J 2301/408; C09J 2203/346; C09J 11/08; C09J 9/00; C09J 5/00; C09J 11/06; C09J 175/04
See application file for complete search history.

(56) References Cited

U.S. PATENT DOCUMENTS

| | | | |
|---|---|---|---|
| 3,400,095 | A | 9/1968 | Kremer et al. |
| 3,578,622 | A | 5/1971 | Brown et al. |
| 3,776,873 | A | 12/1973 | Kremer |
| 5,280,061 | A | 1/1994 | Haraguchi et al. |
| 7,705,056 | B1 | 4/2010 | Carnahan |
| 8,163,824 | B2 | 4/2012 | Okazaki et al. |
| 8,993,663 | B2 | 3/2015 | Wuerch et al. |
| 9,359,523 | B2 | 6/2016 | Dubois et al. |
| 9,453,148 | B2 | 9/2016 | Einsla et al. |
| 9,580,632 | B2 | 2/2017 | Masuko et al. |
| 9,879,160 | B2 | 1/2018 | Schroeyers et al. |
| 10,017,672 | B2 | 7/2018 | Moriguchi et al. |
| 10,233,366 | B2 | 3/2019 | Inoue et al. |
| 10,358,583 | B2 | 7/2019 | Carl et al. |
| 10,550,286 | B2 | 2/2020 | West |

(Continued)

FOREIGN PATENT DOCUMENTS

| | | |
|---|---|---|
| EP | 0616018 A1 | 9/1994 |
| EP | 1160179 A1 | 12/2001 |

(Continued)

*Primary Examiner* — Vishal I Patel
(74) *Attorney, Agent, or Firm* — GREENBERG TRAURIG, LLP

(57) ABSTRACT

Sprayable adhesive compositions are provided. A sprayable adhesive composition comprises at least one propellant, at least one solvent, and at least 50% by weight of solids based on a total weight of the solids and the at least one solvent. The solids comprise at least one polymer and at least one tackifier. Methods of installation, roofing systems, and various other related systems and related methods are provided.

10 Claims, 2 Drawing Sheets

(56) References Cited

U.S. PATENT DOCUMENTS

| | | | |
|---|---|---|---|
| 10,793,752 B2 | 10/2020 | Hussein | |
| 10,988,645 B1 | 4/2021 | Purvis, II et al. | |
| 11,021,611 B2 | 6/2021 | Young | |
| 11,034,868 B2 | 6/2021 | Ueding et al. | |
| 11,262,338 B2 | 3/2022 | Arigo et al. | |
| 11,312,826 B2 | 4/2022 | Schneider | |
| 11,530,341 B1 | 12/2022 | De Houwer et al. | |
| 11,643,578 B2 | 5/2023 | Stafeil et al. | |
| 11,686,094 B2 | 6/2023 | Tang et al. | |
| 11,814,557 B2 | 11/2023 | Widders et al. | |
| 11,920,067 B2 | 3/2024 | Chastek et al. | |
| 12,221,561 B2 | 2/2025 | Park et al. | |
| 12,338,375 B2 | 6/2025 | Okazaki et al. | |
| 12,359,105 B2 | 7/2025 | Ye et al. | |
| 2002/0161056 A1 | 10/2002 | Carnahan | |
| 2005/0011601 A1 | 1/2005 | Whitman | |
| 2006/0188319 A1 | 8/2006 | Nebesnak et al. | |
| 2008/0153970 A1 | 6/2008 | Salazar | |
| 2008/0153971 A1 | 6/2008 | Salazar | |
| 2009/0095404 A1 | 4/2009 | Whitman | |
| 2010/0093903 A1 | 4/2010 | Spies et al. | |
| 2010/0326598 A1 | 12/2010 | Atwater | |
| 2013/0164525 A1* | 6/2013 | Haines ...................... | C09D 7/48 |
| | | | 428/323 |
| 2014/0065432 A1 | 3/2014 | Wuerch et al. | |
| 2022/0064501 A1* | 3/2022 | Rufus ...................... | C09J 11/04 |
| 2023/0304291 A1* | 9/2023 | Tang ...................... | B32B 11/046 |

FOREIGN PATENT DOCUMENTS

| | | | |
|---|---|---|---|
| JP | 198641375 A | 10/1986 | |
| JP | 1996134419 A | 5/1996 | |
| JP | 2005120295 A | 5/2005 | |

* cited by examiner

100

102
OBTAINING A MEMBRANE

104
OBTAINING A SPRAYABLE ADHESIVE COMPOSITION

106
SPRAYING THE SPRAYABLE ADHESIVE COMPOSITION

108
APPLYING THE MEMBRANE TO A SUBSTRATE

SPRAYABLE ADHESIVE COMPOSITIONS AND RELATED SYSTEMS AND RELATED METHODS

CROSS-REFERENCE TO RELATED APPLICATIONS

This application claims priority to U.S. Provisional Patent Application No. 63/560,420, filed Mar. 1, 2024, and titled "SPRAYABLE ADHESIVE COMPOSITIONS AND RELATED SYSTEMS AND RELATED METHODS," the disclosure of which application is hereby incorporated herein by reference in its entirety.

FIELD

This disclosure generally relates to sprayable adhesive compositions and related systems and related methods.

BACKGROUND

Conventional adhesives used in roofing applications present challenges when applied in spray applications. Some of these challenges include difficulty aerosolizing the adhesive, as well as reduced adhesive performance.

SUMMARY

Some embodiments relate to a method. In some embodiments, the method comprises obtaining a roofing membrane. In some embodiments, the method comprises obtaining a sprayable adhesive composition. In some embodiments, the sprayable adhesive composition comprises at least one propellant. In some embodiments, the sprayable adhesive composition comprises at least one solvent. In some embodiments, the sprayable adhesive composition comprises at least 50% by weight of solids based on a total weight of the solids and the at least one solvent. In some embodiments, the solids comprise at least one polymer. In some embodiments, the solids comprise at least one tackifier. In some embodiments, the at least one tackifier comprises a rosin ester. In some embodiments, the method comprises spraying the sprayable adhesive composition onto a roofing substrate, so as to form an adhesive spray film. In some embodiments, the method comprises applying the roofing membrane to the roofing substrate, such that the roofing membrane is bonded to the roofing substrate by the adhesive spray film.

In some embodiments, the roofing membrane comprises a thermoplastic olefin (TPO) membrane, an ethylene propylene diene monomer (EPDM) membrane, a polyvinyl chloride (PVC) membrane, or a silicone membrane.

In some embodiments, the roofing substrate comprises a plywood substrate, an underlayment, or a roofing deck.

In some embodiments, the roofing membrane has a surface energy of 40 mN/m or less.

In some embodiments, the spraying comprises spraying the sprayable adhesive composition onto the roofing substrate so as to result in a coverage rate of at least 1000 ft² per 5 gallons of the sprayable adhesive composition.

In some embodiments, the spraying comprises spraying the sprayable adhesive composition onto the roofing substrate so as to result in a coverage rate of at least 2000 ft² per 5 gallons of the sprayable adhesive composition.

In some embodiments, the rosin ester comprises at least one of a gum rosin ester, a tall oil rosin ester, a wood rosin ester, a rosin acid ester, or any combination thereof.

In some embodiments, the rosin ester comprises at least one of a glycerol rosin ester, a pentaerythritol rosin ester, a hydrogenated glycerol rosin ester, a hydrogenated pentaerythritol rosin ester, or any combination thereof.

In some embodiments, the method does not comprise curing the adhesive spray film.

In some embodiments, the method further comprises spraying the sprayable adhesive composition onto the roofing membrane, so as to form a second adhesive spray film; and applying the roofing membrane to the roofing substrate, such that the roofing membrane is further bonded to the roofing substrate by the second adhesive spray film.

Some embodiments relate to a system. In some embodiments, the system comprises a roofing substrate. In some embodiments, the system comprises a solidified adhesive spray film. In some embodiments, the system comprises a roofing membrane. In some embodiments, the solidified adhesive spray film is located between the roofing substrate and the roofing membrane. In some embodiments, the solidified adhesive spray film bonds the roofing membrane to the roofing substrate. In some embodiments, the roofing membrane has a surface energy of 40 mN/m or less. In some embodiments, the solidified adhesive spray film comprises at least one non-crosslinked polymer. In some embodiments, the solidified adhesive spray film comprises at least one tackifier. In some embodiments, the at least one tackifier comprises a rosin ester.

In some embodiments, the roofing substrate directly contacts the solidified adhesive spray film.

In some embodiments, the roofing membrane directly contacts the solidified adhesive spray film.

In some embodiments, the roofing substrate comprises a plywood substrate, an underlayment, or a roofing deck.

In some embodiments, the roofing membrane comprises a thermoplastic olefin (TPO) membrane, an ethylene propylene diene monomer (EPDM) membrane, a polyvinyl chloride (PVC) membrane, or a silicone membrane.

In some embodiments, the rosin ester comprises at least one of a gum rosin ester, a tall oil rosin ester, a wood rosin ester, a rosin acid ester, or any combination thereof.

In some embodiments, the rosin ester comprises at least one of a glycerol rosin ester, a pentaerythritol rosin ester, a hydrogenated glycerol rosin ester, a hydrogenated pentaerythritol rosin ester, or any combination thereof.

Some embodiments relate to a sprayable adhesive composition. In some embodiments, the sprayable adhesive composition comprises at least one propellant. In some embodiments, the sprayable adhesive composition comprises at least one solvent. In some embodiments, the sprayable adhesive composition comprises at least 50% by weight of solids based on a total weight of the sprayable adhesive composition. In some embodiments, the solids comprise at least one polymer. In some embodiments, the solids comprise at least one tackifier. In some embodiments, the at least one tackifier comprises a rosin ester.

In some embodiments, when the sprayable adhesive composition is sprayed onto a substrate using a spraying device, the sprayable adhesive composition has a coverage rate of at least 1000 ft² per 5 gallons of the sprayable adhesive composition.

In some embodiments, when the sprayable adhesive composition is sprayed onto a substrate using a spraying device, the sprayable adhesive composition has a coverage rate of at least 2000 ft² per 5 gallons of the sprayable adhesive composition.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Sprayable adhesive compositions are provided herein for various applications, including roofing applications. In some embodiments, the sprayable adhesive compositions disclosed herein have a high solids content, with a viscosity sufficient for spraying the sprayable adhesive compositions from a spraying device. In some embodiments, the sprayable adhesive compositions exhibit enhanced adhesion between roofing substrates and roofing membranes with low surface energy. In some embodiments, the high solids content of the sprayable adhesive compositions reduce solvent use relative to conventional adhesives. In some embodiments, the high solids content of the sprayable adhesive compositions improves rate coverage of the adhesive. In some embodiments, the sprayable adhesive compositions are non-reactive sprayable adhesive compositions. In some embodiments, the sprayable adhesive compositions incorporate at least one tackifier. In some embodiments, the tackifier improves both the sprayable adhesive composition's tack and viscosity, such that an adhesive composition that is sprayable is obtained.

Figure 1:
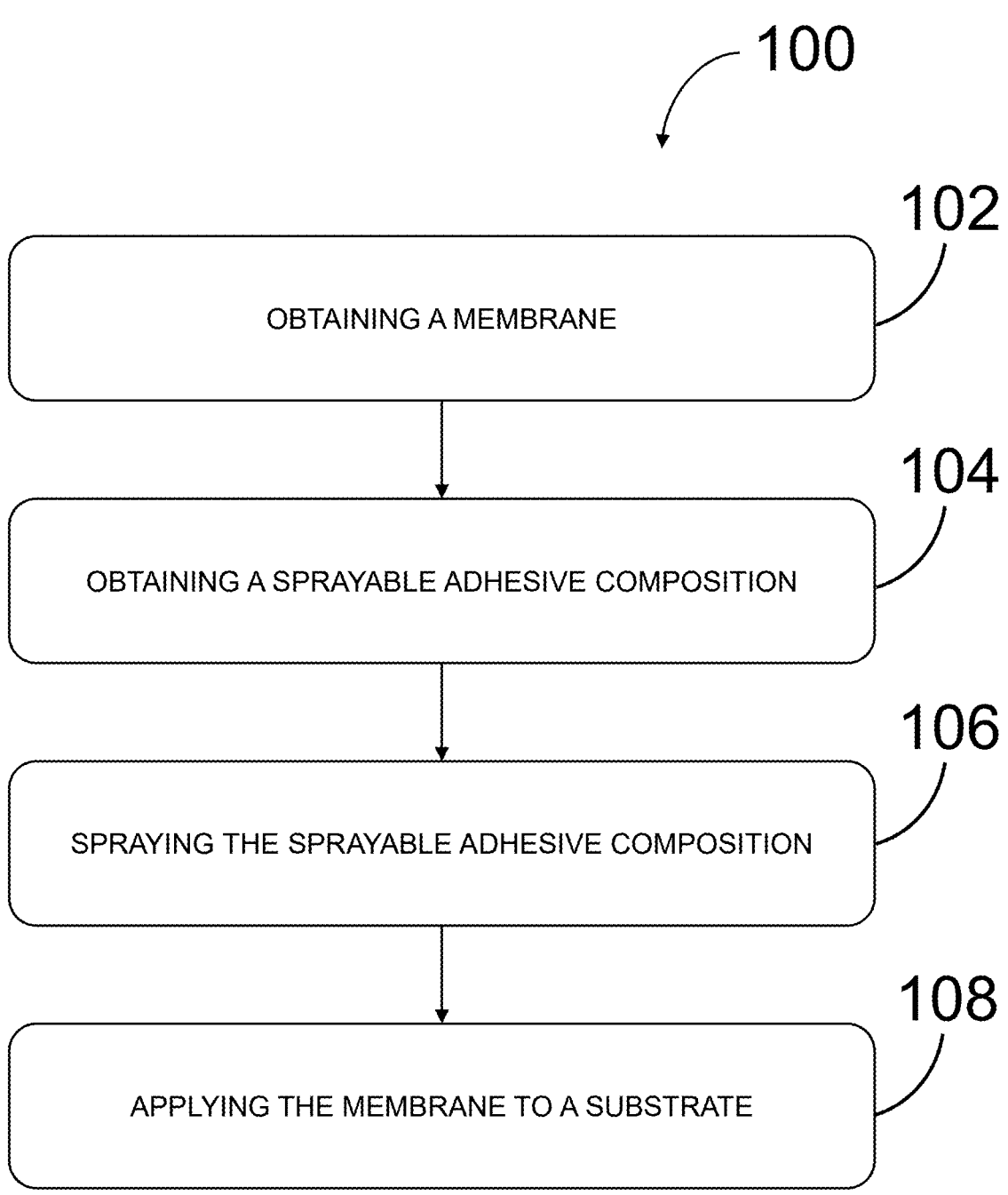
FIG. 1 is a schematic diagram of a flowchart of a method of installation, according to some embodiments.

FIG. 1 is a schematic diagram of a flowchart of a method of installation 100, according to some embodiments. As shown in FIG. 1, in some embodiments, the method of installation 100 comprises one or more of the following steps: obtaining 102 a membrane; obtaining 104 a sprayable adhesive composition; spraying 106 the sprayable adhesive composition; and applying 108 the membrane to a substrate.

At step 102, in some embodiments, the method of installation 100 comprises obtaining a membrane.

In some embodiments, the membrane comprises a single-ply membrane. In some embodiments, the membrane comprises a double-ply or two-ply membrane. In some embodiments, the membrane comprises a multi-ply membrane. In some embodiments, the membrane comprises a reinforcement. For example, in some embodiments, the membrane is a reinforced membrane. In some embodiments, the reinforcement comprises at least one of a scrim, a woven fabric, a non-woven fabric, a metal foil, a fiberglass mat, a polyester mat, a spunbond mat, or any combination thereof. In some embodiments, the membrane comprises at least one sheet. In some embodiments, the membrane comprises only one sheet. In some embodiments, the membrane comprises a plurality of sheets. In some embodiments, the membrane comprises at least one polymer. In some embodiments, the membrane comprises at least one of a thermoplastic polyolefin (TPO), a polyvinylchloride (PVC), an ethylene-propylene diene monomer (EPDM), a silyl-terminated polymer, a polysiloxane, a styrene-isoprene-styrene (SIS) polymer, styrene-butadiene-styrene (SBS), styrene-ethylene/butadiene-styrene (SEBS), styrene-ethylene-propylene-styrene (SEPS), a styrene-butadiene rubber (SBR), styrene-ethylene/propylene (SEP), an asphalt, a linear polysiloxane, a cyclic polysiloxane, a branched polysiloxane, a silyl-terminated polyurethane, a silyl-terminated polyether, a silyl-terminated acrylic, a silyl-terminated polyester, polyester, polyethylene, polypropylene, polyurethane, polyurea, a liquid silicone resin, a liquid silicone rubber resin (LSR), a heat cured silicone resin, a silicone gum, a polyester, polyethylene, polypropylene, polyurethane, polyurea, a liquid silicone resin, or any combination thereof. In some embodiments, the membrane is an asphaltic membrane. In some embodiments, the membrane comprises a fleece-backed membrane. In some embodiments, the membrane is a thermoplastic polyolefin (TPO) membrane. In some embodiments, the membrane is a polyvinyl chloride (PVC) membrane. In some embodiments, the membrane is an ethylene propylene diene monomer (EPDM) membrane. In some embodiments, the membrane is a silyl-terminated polymer membrane (e.g., a silyl-terminated polyester, a silyl-terminated polyurethane, a silyl-terminated polyolefin, etc.). In some embodiments, the membrane is a silicone membrane. In some embodiments, the membrane comprises a thermoplastic polymer. In some embodiments, the membrane comprises an adhesive layer on at least one surface of the membrane. In some embodiments, the adhesive layer is configured to adhere the membrane to a surface, such as, for example and without limitation, a surface of a building structure.

In some embodiments, the membrane comprises a thermoplastic polyolefin. In some embodiments, the thermoplastic polyolefin comprises at least one of a polyethylene, a polypropylene, a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), an oxidized polyethylene (OPE), polypropylenes (e.g., isotactic polypropylene (IPP) and/or atactic polypropylene (APP/IPP)), amorphous polyalpha olefins (APAO), amorphous polyolefins (APO), or any combination thereof. In some embodiments, the at least one polymer comprises polyethylene terephthalate (PET). In some embodiments, the at least one polymer comprises an acrylic polymer, such as, for example, polymethyl methacrylate. In some embodiments, the membrane comprises thermoplastic polyolefins, polyvinyl chlorides, cyclopiazonic acid, chlorinated polyethylene resins, ethylene interpolymers, nitrile butadiene polymers, polyisobutylene, atactic-polypropylene, APP-modified bitumen, poly(styrene-butadiene-styrene), styrene ethylene butylene styrene, ethylene propylene diene monomers, chlorosulfonated polyethylene rubbers, polychloroprene, extracellular region membranes, polycarbonate, nylon, polyvinyl acetate, polystyrene, polytetrafluoroethylene, polyvinylidene fluoride, polyurethane, epoxy, or combinations thereof.

Examples of the at least one polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvaloy®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex®

P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the membrane has a thickness of 1 mil to 200 mils. In some embodiments, the membrane has a thickness of 10 mils to 200 mils. In some embodiments, the membrane has a thickness of 20 mils to 200 mils. In some embodiments, the membrane has a thickness of 30 mils to 200 mils. In some embodiments, the membrane has a thickness of 40 mils to 200 mils. In some embodiments, the membrane has a thickness of 50 mils to 200 mils. In some embodiments, the membrane has a thickness of 60 mils to 200 mils. In some embodiments, the membrane has a thickness of 70 mils to 200 mils. In some embodiments, the membrane has a thickness of 80 mils to 200 mils. In some embodiments, the membrane has a thickness of 90 mils to 200 mils. In some embodiments, the membrane has a thickness of 100 mils to 200 mils. In some embodiments, the membrane has a thickness of 110 mils to 200 mils. In some embodiments, the membrane has a thickness of 120 mils to 200 mils. In some embodiments, the membrane has a thickness of 130 mils to 200 mils. In some embodiments, the membrane has a thickness of 140 mils to 200 mils. In some embodiments, the membrane has a thickness of 150 mils to 200 mils. In some embodiments, the membrane has a thickness of 160 mils to 200 mils. In some embodiments, the membrane has a thickness of 170 mils to 200 mils. In some embodiments, the membrane has a thickness of 180 mils to 200 mils. In some embodiments, the membrane has a thickness of 190 mils to 200 mils.

In some embodiments, the membrane has a thickness of 1 mil to 190 mils. In some embodiments, the membrane has a thickness of 1 mil to 180 mils. In some embodiments, the membrane has a thickness of 1 mil to 170 mils. In some embodiments, the membrane has a thickness of 1 mil to 160 mils. In some embodiments, the membrane has a thickness of 1 mil to 150 mils. In some embodiments, the membrane has a thickness of 1 mil to 140 mils. In some embodiments, the membrane has a thickness of 1 mil to 130 mils. In some embodiments, the membrane has a thickness of 1 mil to 120 mils. In some embodiments, the membrane has a thickness of 1 mil to 110 mils. In some embodiments, the membrane has a thickness of 1 mil to 100 mils. In some embodiments, the membrane has a thickness of 1 mil to 90 mils. In some embodiments, the membrane has a thickness of 1 mil to 80 mils. In some embodiments, the membrane has a thickness of 1 mil to 70 mils. In some embodiments, the membrane has a thickness of 1 mil to 60 mils. In some embodiments, the membrane has a thickness of 1 mil to 50 mils. In some embodiments, the membrane has a thickness of 1 mil to 40 mils. In some embodiments, the membrane has a thickness of 1 mil to 30 mils. In some embodiments, the membrane has a thickness of 1 mil to 20 mils. In some embodiments, the membrane has a thickness of 1 mil to 10 mils.

At step 104, in some embodiments, the method of installation 100 comprises obtaining a sprayable adhesive composition.

As used herein, the term "sprayable adhesive composition" refers to a composition that, when combined with at least one propellent in a container of a spraying device, is sprayable from the spraying device. In some embodiments, the term "sprayable adhesive composition" refers to a composition that, when combined with at least one propellent in a container of a spraying device, is aerosolizable from the spraying device.

In some embodiments, the sprayable adhesive composition comprises a non-reactive sprayable adhesive composition.

As used herein, the term "non-reactive," when used in reference to an adhesive (e.g., a non-reactive sprayable adhesive composition), refers to an adhesive that does not require a chemical reaction to form a bond. In some embodiments, the term "non-reactive" includes a non-reactive adhesive that undergoes a chemical reaction, wherein the chemical reaction is not required to form a bond. In some embodiments, the term "non-reactive" includes a non-reactive adhesive that undergoes a chemical reaction, wherein the chemical reaction has a negligible effect on bond formation. Non-limiting examples of non-reactive adhesives include at least one of a contact adhesive, a pressure sensitive adhesive, a drying adhesive, a hot-melt adhesive, or any combination thereof. In some embodiments, the term "non-reactive" includes a non-reactive adhesive that does not require crosslinking and/or curing to form a bond. In some embodiments, the method does not comprise a step of curing (e.g., curing an adhesive spray film, curing a first adhesive spray film and/or a second adhesive spray film, etc.).

In some embodiments, the sprayable adhesive composition comprises at least one polymer.

In some embodiments, the sprayable adhesive composition comprises 5% to 30% by weight of the at least one polymer based on the total weight of the sprayable adhesive composition. In some embodiments, the sprayable adhesive composition comprises 5% to 28% by weight of the at least one polymer based on the total weight of the sprayable adhesive composition. In some embodiments, the sprayable adhesive composition comprises 5% to 26% by weight of the at least one polymer based on the total weight of the sprayable adhesive composition. In some embodiments, the sprayable adhesive composition comprises 5% to 25% by weight of the at least one polymer based on the total weight of the sprayable adhesive composition. In some embodiments, the sprayable adhesive composition comprises 5% to 24% by weight of the at least one polymer based on the total weight of the sprayable adhesive composition. In some embodiments, the sprayable adhesive composition comprises 5% to 22% by weight of the at least one polymer based on the total weight of the sprayable adhesive composition. In some embodiments, the sprayable adhesive composition comprises 5% to 20% by weight of the at least one polymer based on the total weight of the sprayable adhesive composition. In some embodiments, the sprayable adhesive composition comprises 5% to 18% by weight of the at least one polymer based on the total weight of the sprayable adhesive composition. In some embodiments, the sprayable adhesive composition comprises 5% to 16% by weight of the at least one polymer based on the total weight of the sprayable adhesive composition. In some embodiments, the sprayable adhesive composition comprises 5% to 15% by weight of the at least one polymer based on the total weight of the sprayable adhesive composition. In some embodiments, the sprayable adhesive composition comprises 5% to 14% by weight of the at least one polymer based on the total weight of the sprayable adhesive composition. In some embodiments, the sprayable adhesive composition comprises 5% to 12% by weight of the at least one polymer based on the total weight of the sprayable adhesive composition. In some embodiments, the sprayable adhesive composition comprises 5% to 10% by weight of the at least one polymer based on the total weight of the sprayable adhesive composition. In some embodiments, the sprayable adhesive composition comprises 5% to 8% by weight of the at least one polymer based on the total weight of the sprayable adhesive composition. In some embodiments, the sprayable adhesive composition comprises 5% to 6% by weight of the at least one polymer based on the total weight of the sprayable adhesive composition.

In some embodiments, the sprayable adhesive composition comprises 6% to 30% by weight of the at least one polymer based on the total weight of the sprayable adhesive composition. In some embodiments, the sprayable adhesive composition comprises 8% to 30% by weight of the at least one polymer based on the total weight of the sprayable adhesive composition. In some embodiments, the sprayable adhesive composition comprises 10% to 30% by weight of the at least one polymer based on the total weight of the sprayable adhesive composition. In some embodiments, the sprayable adhesive composition comprises 12% to 30% by weight of the at least one polymer based on the total weight of the sprayable adhesive composition. In some embodiments, the sprayable adhesive composition comprises 14% to 30% by weight of the at least one polymer based on the total weight of the sprayable adhesive composition. In some embodiments, the sprayable adhesive composition comprises 15% to 30% by weight of the at least one polymer based on the total weight of the sprayable adhesive composition. In some embodiments, the sprayable adhesive composition comprises 16% to 30% by weight of the at least one polymer based on the total weight of the sprayable adhesive composition. In some embodiments, the sprayable adhesive composition comprises 18% to 30% by weight of the at least one polymer based on the total weight of the sprayable adhesive composition. In some embodiments, the sprayable adhesive composition comprises 20% to 30% by weight of the at least one polymer based on the total weight of the sprayable adhesive composition. In some embodiments, the sprayable adhesive composition comprises 22% to 30% by weight of the at least one polymer based on the total weight of the sprayable adhesive composition. In some embodiments, the sprayable adhesive composition comprises 24% to 30% by weight of the at least one polymer based on the total weight of the sprayable adhesive composition. In some embodiments, the sprayable adhesive composition comprises 25% to 30% by weight of the at least one polymer based on the total weight of the sprayable adhesive composition. In some embodiments, the sprayable adhesive composition comprises 26% to 30% by weight of the at least one polymer based on the total weight of the sprayable adhesive composition. In some embodiments, the sprayable adhesive composition comprises 28% to 30% by weight of the at least one polymer based on the total weight of the sprayable adhesive composition.

In some embodiments, the at least one polymer comprises at least one of a styrenic polymer (e.g., a styrenic block copolymer), a polysiloxane, a polyurea, a polyurethane, a silyl-terminated polymer (e.g., a silyl-terminated polyester, a silyl-terminated polyurethane, a silyl-terminated polyolefin, etc.), a polyolefin, a thermoplastic polymer, an epoxy (e.g., an epoxy resin), an acrylic (e.g., an acrylic resin, a polyacrylic resin, a polymethylmethacrylate, etc.), a polyvinylidene fluoride, a polyvinylidene difluoride, any precursor thereof, any copolymer thereof, or any combination thereof. In some embodiments, the styrenic polymer comprises at least one of a styrene-butadiene-styrene (SBS) copolymer, a styrene-isoprene-styrene copolymer (SIS), a styrene-ethylene-butylene-styrene (SEBS) copolymer, or any combination thereof. In some embodiments, the acrylic comprises at least one of poly(methyl methacrylate) (PMMA), polyacrylonitrile (PAN), poly(hydroxyethyl methacrylate), poly(glyceryl methacrylate), poly(ethyl methacrylate), poly(isobutyl methacrylate), poly(acrylic acid), poly($\alpha$-methyl cyanoacrylate), an acrylic latex resin, acrylic-polyvinyl chloride (acrylic-PVC), acrylic-styrene, isobornyl methacrylate, isobornyl acrylate, ethyl methacrylate, isobutyl methacrylate, n-butyl methacrylate, ethyl acrylate, n-butyl acrylate, 2-hexyl ethyl acrylate, or any combination thereof.

In some embodiments, the sprayable adhesive composition comprises at least one tackifier.

In some embodiments, the sprayable adhesive composition comprises 10% to 60% by weight of the at least one tackifier based on the total weight of the sprayable adhesive composition. In some embodiments, the sprayable adhesive composition comprises 10% to 55% by weight of the at least one tackifier based on the total weight of the sprayable adhesive composition. In some embodiments, the sprayable adhesive composition comprises 10% to 50% by weight of the at least one tackifier based on the total weight of the sprayable adhesive composition. In some embodiments, the sprayable adhesive composition comprises 10% to 45% by weight of the at least one tackifier based on the total weight of the sprayable adhesive composition. In some embodiments, the sprayable adhesive composition comprises 10% to 40% by weight of the at least one tackifier based on the total weight of the sprayable adhesive composition. In some embodiments, the sprayable adhesive composition comprises 10% to 35% by weight of the at least one tackifier based on the total weight of the sprayable adhesive composition. In some embodiments, the sprayable adhesive composition comprises 10% to 30% by weight of the at least one tackifier based on the total weight of the sprayable adhesive composition. In some embodiments, the sprayable adhesive composition comprises 10% to 25% by weight of the at least one tackifier based on the total weight of the sprayable adhesive composition. In some embodiments, the sprayable adhesive composition comprises 10% to 20% by weight of the at least one tackifier based on the total weight of the sprayable adhesive composition. In some embodiments, the sprayable adhesive composition comprises 10% to 15% by weight of the at least one tackifier based on the total weight of the sprayable adhesive composition.

In some embodiments, the sprayable adhesive composition comprises 15% to 60% by weight of the at least one tackifier based on the total weight of the sprayable adhesive composition. In some embodiments, the sprayable adhesive composition comprises 20% to 60% by weight of the at least one tackifier based on the total weight of the sprayable adhesive composition. In some embodiments, the sprayable adhesive composition comprises 25% to 60% by weight of the at least one tackifier based on the total weight of the sprayable adhesive composition. In some embodiments, the sprayable adhesive composition comprises 30% to 60% by weight of the at least one tackifier based on the total weight of the sprayable adhesive composition. In some embodiments, the sprayable adhesive composition comprises 35% to 60% by weight of the at least one tackifier based on the total weight of the sprayable adhesive composition. In some embodiments, the sprayable adhesive composition comprises 40% to 60% by weight of the at least one tackifier based on the total weight of the sprayable adhesive composition. In some embodiments, the sprayable adhesive composition comprises 45% to 60% by weight of the at least one tackifier based on the total weight of the sprayable adhesive composition. In some embodiments, the sprayable adhesive composition comprises 50% to 60% by weight of the at least one tackifier based on the total weight of the sprayable adhesive composition. In some embodiments, the sprayable adhesive composition comprises 55% to 60% by weight of the at least one tackifier based on the total weight of the sprayable adhesive composition.

In some embodiments, the at least one tackifier comprises a rosin ester. In some embodiments, the rosin ester comprises at least one of a natural rosin ester, a synthetic rosin ester, or any combination thereof. In some embodiments, the rosin ester comprises at least one of a gum rosin ester, a tall oil rosin ester, a wood rosin ester, a rosin acid ester, or any combination thereof. In some embodiments, the rosin ester comprises a reaction product of a rosin and an alcohol. In some embodiments, the rosin ester comprises a reaction product of a rosin and an alcohol, wherein the rosin comprises a rosin acid and wherein the alcohol comprises a polyhydric alcohol. In some embodiments, for example, the polyhydric alcohol comprises at least one an ethylene glycol, a propylene glycol, a diethylene glycol, a triethylene glycol, a tetraethylene glycol, a trimethylene glycol, a glycerol, a trimethylolpropane, a trimethylolethane, a pentaerythritol, a mannitol, or any combination thereof. In some embodiments, the rosin ester comprises at least one of a glycerol rosin ester, a pentaerythritol rosin ester, a hydrogenated glycerol rosin ester, a hydrogenated pentaerythritol rosin ester, or any combination thereof. In some embodiments, the rosin ester comprises a hydrogenated version of any one or more of the foregoing rosin esters.

In some embodiments, the at least one tackifier comprises at least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

In some embodiments, the sprayable adhesive composition comprises at least one antioxidant.

In some embodiments, the sprayable adhesive composition comprises 0.01% to 10% by weight of the at least one antioxidant based on the total weight of the sprayable adhesive composition. In some embodiments, the sprayable adhesive composition comprises 0.01% to 9% by weight of the at least one antioxidant based on the total weight of the sprayable adhesive composition. In some embodiments, the sprayable adhesive composition comprises 0.01% to 8% by weight of the at least one antioxidant based on the total weight of the sprayable adhesive composition. In some embodiments, the sprayable adhesive composition comprises 0.01% to 7% by weight of the at least one antioxidant based on the total weight of the sprayable adhesive composition. In some embodiments, the sprayable adhesive composition comprises 0.01% to 6% by weight of the at least one antioxidant based on the total weight of the sprayable adhesive composition. In some embodiments, the sprayable adhesive composition comprises 0.01% to 5% by weight of the at least one antioxidant based on the total weight of the sprayable adhesive composition. In some embodiments, the sprayable adhesive composition comprises 0.01% to 4% by weight of the at least one antioxidant based on the total weight of the sprayable adhesive composition. In some embodiments, the sprayable adhesive composition comprises 0.01% to 3% by weight of the at least one antioxidant based on the total weight of the sprayable adhesive composition. In some embodiments, the sprayable adhesive composition comprises 0.01% to 2% by weight of the at least one antioxidant based on the total weight of the sprayable adhesive composition. In some embodiments, the sprayable adhesive composition comprises 0.01% to 1% by weight of the at least one antioxidant based on the total weight of the sprayable adhesive composition. In some embodiments, the sprayable adhesive composition comprises 0.01% to 0.1% by weight of the at least one antioxidant based on the total weight of the sprayable adhesive composition.

In some embodiments, the sprayable adhesive composition comprises 0.1% to 10% by weight of the at least one antioxidant based on the total weight of the sprayable adhesive composition. In some embodiments, the sprayable adhesive composition comprises 2% to 10% by weight of the at least one antioxidant based on the total weight of the sprayable adhesive composition. In some embodiments, the sprayable adhesive composition comprises 3% to 10% by weight of the at least one antioxidant based on the total weight of the sprayable adhesive composition. In some embodiments, the sprayable adhesive composition comprises 4% to 10% by weight of the at least one antioxidant based on the total weight of the sprayable adhesive composition. In some embodiments, the sprayable adhesive composition comprises 5% to 10% by weight of the at least one antioxidant based on the total weight of the sprayable adhesive composition. In some embodiments, the sprayable adhesive composition comprises 6% to 10% by weight of the at least one antioxidant based on the total weight of the sprayable adhesive composition. In some embodiments, the sprayable adhesive composition comprises 7% to 10% by weight of the at least one antioxidant based on the total weight of the sprayable adhesive composition. In some embodiments, the sprayable adhesive composition comprises 8% to 10% by weight of the at least one antioxidant based on the total weight of the sprayable adhesive composition. In some embodiments, the sprayable adhesive composition comprises 9% to 10% by weight of the at least one antioxidant based on the total weight of the sprayable adhesive composition.

In some embodiments, the antioxidant comprises at least one of a hindered phenolic antioxidant, a sterically hindered primary phenolic antioxidant stabilizer, an organophosphate antioxidant, an aromatic amine antioxidant, or any combination thereof. Non-limiting examples of antioxidants include, for example and without limitation, at least one of the hindered phenolic antioxidants, such as, the Irganox® family of antioxidants (available from BASF, Florham Park, N.J., US) and the Anox® family of antioxidants (available from Addivant, Danbury, Conn., US); organophosphite antioxidants, such as, the Irgofos® family of antioxidants (available from BASF, Florham Park, N.J., US) and the Ultranox® family of antioxidants (available from Addivant, Danbury, Conn., US); and the aromatic amine antioxidants such as the Naugard® family of antioxidants (available from Addivant, Danbury, Conn., US) and Agerite® Stalite® family of antioxidants (available from Vanderbilt Chemicals, LLC, Norwalk, Conn., US).

In some embodiments, the sprayable adhesive composition comprises at least one colorant.

In some embodiments, the sprayable adhesive composition comprises 1% to 20% by weight of the at least one colorant based on the total weight of the sprayable adhesive composition. In some embodiments, the sprayable adhesive composition comprises 2% to 20% by weight of the at least one colorant based on the total weight of the sprayable adhesive composition. In some embodiments, the sprayable adhesive composition comprises 4% to 20% by weight of the at least one colorant based on the total weight of the sprayable adhesive composition. In some embodiments, the sprayable adhesive composition comprises 5% to 20% by weight of the at least one colorant based on the total weight of the sprayable adhesive composition. In some embodiments, the sprayable adhesive composition comprises 6% to 20% by weight of the at least one colorant based on the total weight of the sprayable adhesive composition. In some embodiments, the sprayable adhesive composition comprises 8% to 20% by weight of the at least one colorant based on the total weight of the sprayable adhesive composition. In some embodiments, the sprayable adhesive composition comprises 10% to 20% by weight of the at least one colorant based on the total weight of the sprayable adhesive composition. In some embodiments, the sprayable adhesive composition comprises 12% to 20% by weight of the at least one colorant based on the total weight of the sprayable adhesive composition. In some embodiments, the sprayable adhesive composition comprises 14% to 20% by weight of the at least one colorant based on the total weight of the sprayable adhesive composition. In some embodiments, the sprayable adhesive composition comprises 15% to 20% by weight of the at least one colorant based on the total weight of the sprayable adhesive composition. In some embodiments, the sprayable adhesive composition comprises 16% to 20% by weight of the at least one colorant based on the total weight of the sprayable adhesive composition. In some embodiments, the sprayable adhesive composition comprises 18% to 20% by weight of the at least one colorant based on the total weight of the sprayable adhesive composition.

In some embodiments, the sprayable adhesive composition comprises 1% to 18% by weight of the at least one colorant based on the total weight of the sprayable adhesive composition. In some embodiments, the sprayable adhesive composition comprises 1% to 16% by weight of the at least one colorant based on the total weight of the sprayable adhesive composition. In some embodiments, the sprayable adhesive composition comprises 1% to 15% by weight of the at least one colorant based on the total weight of the sprayable adhesive composition. In some embodiments, the sprayable adhesive composition comprises 1% to 14% by weight of the at least one colorant based on the total weight of the sprayable adhesive composition. In some embodiments, the sprayable adhesive composition comprises 1% to 12% by weight of the at least one colorant based on the total weight of the sprayable adhesive composition. In some embodiments, the sprayable adhesive composition comprises 1% to 10% by weight of the at least one colorant based on the total weight of the sprayable adhesive composition. In some embodiments, the sprayable adhesive composition comprises 1% to 8% by weight of the at least one colorant based on the total weight of the sprayable adhesive composition. In some embodiments, the sprayable adhesive composition comprises 1% to 6% by weight of the at least one colorant based on the total weight of the sprayable adhesive composition. In some embodiments, the sprayable adhesive composition comprises 1% to 5% by weight of the at least one colorant based on the total weight of the sprayable adhesive composition. In some embodiments, the sprayable adhesive composition comprises 1% to 4% by weight of the at least one colorant based on the total weight of the sprayable adhesive composition. In some embodiments, the sprayable adhesive composition comprises 1% to 2% by weight of the at least one colorant based on the total weight of the sprayable adhesive composition.

In some embodiments, the colorant comprises at least one of a pigment, a dye, or any combination thereof. In some embodiments, the colorant comprises at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colorant comprises at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof. In some embodiments, the colorant comprises water. In some embodiments, the pigment comprises at least one of zinc oxide, antimony oxide, zirconium oxide, chromium oxide, iron oxide, lead oxide, zinc sulfide, titanium dioxide (anatase, rutile, or brookite), lithopone, and carbon black, or any combination thereof.

Some examples of commercially available materials suitable for inclusion in the sprayable adhesive composition include, without limitation, at least one of Colonial Red, which is a reflective pigment that is available from Americhem Inc., Cuyahoga Falls, Ohio; Ti Pure™ Titanium Dioxide from Chemours, Wilmington, Delaware; pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), TZ4002/600 (mica and iron oxide, bronze appearance); pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon aluminum oxide platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on SiO2 platelets coated with metal oxides, including ColorStream F 20-00 WNT autumn mystery and ColorStream F 20-07 WNT viola fantasy; Chrom Brite™ CB4500, available from Bead Brite, 400 Oser Ave, Suite 600, Hauppauge, N.Y. 11788; pigments available from Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

In some embodiments, the sprayable adhesive composition comprises at least one additive.

In some embodiments, the sprayable adhesive composition comprises 1% to 70% by weight of the at least one additive based on the total weight of the sprayable adhesive composition. In some embodiments, the sprayable adhesive composition comprises 1% to 65% by weight of the at least one additive based on the total weight of the sprayable adhesive composition. In some embodiments, the sprayable adhesive composition comprises 1% to 60% by weight of the at least one additive based on the total weight of the sprayable adhesive composition. In some embodiments, the sprayable adhesive composition comprises 1% to 55% by weight of the at least one additive based on the total weight of the sprayable adhesive composition. In some embodiments, the sprayable adhesive composition comprises 1% to 50% by weight of the at least one additive based on the total weight of the sprayable adhesive composition. In some embodiments, the sprayable adhesive composition comprises 1% to 45% by weight of the at least one additive based on the total weight of the sprayable adhesive composition. In some embodiments, the sprayable adhesive composition comprises 1% to 40% by weight of the at least one additive based on the total weight of the sprayable adhesive composition. In some embodiments, the sprayable adhesive composition comprises 1% to 35% by weight of the at least one additive based on the total weight of the sprayable adhesive composition. In some embodiments, the sprayable adhesive composition comprises 1% to 30% by weight of the at least one additive based on the total weight of the sprayable adhesive composition. In some embodiments, the sprayable adhesive composition comprises 1% to 25% by weight of the at least one additive based on the total weight of the sprayable adhesive composition. In some embodiments, the sprayable adhesive composition comprises 1% to 20% by weight of the at least one additive based on the total weight of the sprayable adhesive composition. In some embodiments, the sprayable adhesive composition comprises 1% to 15% by weight of the at least one additive based on the total weight of the sprayable adhesive composition. In some embodiments, the sprayable adhesive composition comprises 1% to 10% by weight of the at least one additive based on the total weight of the sprayable adhesive composition. In some embodiments, the sprayable adhesive composition comprises 1% to 5% by weight of the at least one additive based on the total weight of the sprayable adhesive composition.

In some embodiments, the sprayable adhesive composition comprises 5% to 70% by weight of the at least one additive based on the total weight of the sprayable adhesive composition. In some embodiments, the sprayable adhesive composition comprises 10% to 70% by weight of the at least one additive based on the total weight of the sprayable adhesive composition. In some embodiments, the sprayable adhesive composition comprises 15% to 70% by weight of the at least one additive based on the total weight of the sprayable adhesive composition. In some embodiments, the sprayable adhesive composition comprises 20% to 70% by weight of the at least one additive based on the total weight of the sprayable adhesive composition. In some embodiments, the sprayable adhesive composition comprises 25% to 70% by weight of the at least one additive based on the total weight of the sprayable adhesive composition. In some embodiments, the sprayable adhesive composition comprises 30% to 70% by weight of the at least one additive based on the total weight of the sprayable adhesive composition. In some embodiments, the sprayable adhesive composition comprises 35% to 70% by weight of the at least one additive based on the total weight of the sprayable adhesive composition. In some embodiments, the sprayable adhesive composition comprises 40% to 70% by weight of the at least one additive based on the total weight of the sprayable adhesive composition. In some embodiments, the sprayable adhesive composition comprises 45% to 70% by weight of the at least one additive based on the total weight of the sprayable adhesive composition. In some embodiments, the sprayable adhesive composition comprises 50% to 70% by weight of the at least one additive based on the total weight of the sprayable adhesive composition. In some embodiments, the sprayable adhesive composition comprises 55% to 70% by weight of the at least one additive based on the total weight of the sprayable adhesive composition. In some embodiments, the sprayable adhesive composition comprises 60% to 70% by weight of the at least one additive based on the total weight of the sprayable adhesive composition. In some embodiments, the sprayable adhesive composition comprises 65% to 70% by weight of the at least one additive based on the total weight of the sprayable adhesive composition.

In some embodiments, the at least one additive comprises at least one of waxes (e.g., paraffin-based waxes and synthetic Fischer-Tropsch waxes), adhesion promoters, process oils, stabilizers (e.g., antioxidants and UV stabilizers), processing aids, plasticizers (e.g., benzoates and phthalates), paraffin oils, nucleating agents, optical brighteners, biocides, flame retardants, anti-static agents, anti-slip agents, anti-blocking agents, lubricants, fillers, or any combination thereof.

In some embodiments, the at least one filler comprises at least one of nepheline syenite, calcium carbonate, barium sulfate, iron oxide, diatomaceous earth, melamine, quartz, silica, colloidal silica, crystalline silica, precipitated silica, amorphous silica, titanium dioxide, alumina trihydrate, zinc oxide, zirconium oxide, zirconium silicate, zinc borate, chromic oxide, crystalline silica fine powder, amorphous silica fine powder, silicone rubber powder, glass, glass bubbles, glass powder, zeolites, silica hydrogen, silica aerogel, calcium silicate, aluminum silicate, ground tire rubber, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum, slaked lime, or any combination thereof.

In some embodiments, the sprayable adhesive composition comprises at least one solvent.

In some embodiments, the sprayable adhesive composition comprises 10% to 60% by weight of the at least one solvent based on the total weight of the sprayable adhesive composition. In some embodiments, the sprayable adhesive composition comprises 10% to 55% by weight of the at least one solvent based on the total weight of the sprayable adhesive composition. In some embodiments, the sprayable adhesive composition comprises 10% to 50% by weight of the at least one solvent based on the total weight of the sprayable adhesive composition. In some embodiments, the sprayable adhesive composition comprises 10% to 45% by weight of the at least one solvent based on the total weight of the sprayable adhesive composition. In some embodiments, the sprayable adhesive composition comprises 10% to 40% by weight of the at least one solvent based on the total weight of the sprayable adhesive composition. In some embodiments, the sprayable adhesive composition comprises 10% to 35% by weight of the at least one solvent based on the total weight of the sprayable adhesive composition. In some embodiments, the sprayable adhesive composition comprises 10% to 30% by weight of the at least one solvent based on the total weight of the sprayable adhesive composition. In some embodiments, the sprayable adhesive composition comprises 10% to 25% by weight of the at least one solvent based on the total weight of the sprayable adhesive composition. In some embodiments, the sprayable adhesive composition comprises 10% to 20% by weight of the at least one solvent based on the total weight of the sprayable adhesive composition. In some embodiments, the sprayable adhesive composition comprises 10% to 15% by weight of the at least one solvent based on the total weight of the sprayable adhesive composition.

In some embodiments, the sprayable adhesive composition comprises 15% to 60% by weight of the at least one solvent based on the total weight of the sprayable adhesive composition. In some embodiments, the sprayable adhesive composition comprises 20% to 60% by weight of the at least one solvent based on the total weight of the sprayable adhesive composition. In some embodiments, the sprayable adhesive composition comprises 25% to 60% by weight of the at least one solvent based on the total weight of the sprayable adhesive composition. In some embodiments, the sprayable adhesive composition comprises 30% to 60% by weight of the at least one solvent based on the total weight of the sprayable adhesive composition. In some embodiments, the sprayable adhesive composition comprises 35% to 60% by weight of the at least one solvent based on the total weight of the sprayable adhesive composition. In some embodiments, the sprayable adhesive composition comprises 40% to 60% by weight of the at least one solvent based on the total weight of the sprayable adhesive composition. In some embodiments, the sprayable adhesive composition comprises 45% to 60% by weight of the at least one solvent based on the total weight of the sprayable adhesive composition. In some embodiments, the sprayable adhesive composition comprises 50% to 60% by weight of the at least one solvent based on the total weight of the sprayable adhesive composition. In some embodiments, the sprayable adhesive composition comprises 55% to 60% by weight of the at least one solvent based on the total weight of the sprayable adhesive composition.

In some embodiments, the at least one solvent comprises at least one of an organic solvent, an aqueous solvent, or any combination thereof. In some embodiments, the at least one solvent comprises at least one of toluene, benzene, xylene, naphtha, cyclohexane, methylcyclohexane, pentane, hexane, heptane, dichloroethylene, trichloroethylene, parachlorobenzotrifluoride, methyl ethyl ketone, acetone, methanol, ethanol, n-propanol, isopropyl alcohol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, cyclohexanol, methyl acetate, tert-butyl acetate, dimethyl carbonate, methylene chloride, or any combination thereof.

In some embodiments, the sprayable adhesive composition comprises at least one propellant.

In some embodiments, the sprayable adhesive composition comprises 1% to 50% by weight of the at least one propellant based on the total weight of the sprayable adhesive composition. In some embodiments, the sprayable adhesive composition comprises 1% to 45% by weight of the at least one propellant based on the total weight of the sprayable adhesive composition. In some embodiments, the sprayable adhesive composition comprises 1% to 40% by weight of the at least one propellant based on the total weight of the sprayable adhesive composition. In some embodiments, the sprayable adhesive composition comprises 1% to 35% by weight of the at least one propellant based on the total weight of the sprayable adhesive composition. In some embodiments, the sprayable adhesive composition comprises 1% to 30% by weight of the at least one propellant based on the total weight of the sprayable adhesive composition. In some embodiments, the sprayable adhesive composition comprises 1% to 25% by weight of the at least one propellant based on the total weight of the sprayable adhesive composition. In some embodiments, the sprayable adhesive composition comprises 1% to 20% by weight of the at least one propellant based on the total weight of the sprayable adhesive composition. In some embodiments, the sprayable adhesive composition comprises 1% to 15% by weight of the at least one propellant based on the total weight of the sprayable adhesive composition. In some embodiments, the sprayable adhesive composition comprises 1% to 10% by weight of the at least one propellant based on the total weight of the sprayable adhesive composition. In some embodiments, the sprayable adhesive composition comprises 1% to 5% by weight of the at least one propellant based on the total weight of the sprayable adhesive composition.

In some embodiments, the sprayable adhesive composition comprises 5% to 50% by weight of the at least one propellant based on the total weight of the sprayable adhesive composition. In some embodiments, the sprayable adhesive composition comprises 10% to 50% by weight of the at least one propellant based on the total weight of the sprayable adhesive composition. In some embodiments, the sprayable adhesive composition comprises 15% to 50% by weight of the at least one propellant based on the total weight of the sprayable adhesive composition. In some embodiments, the sprayable adhesive composition comprises 20% to 50% by weight of the at least one propellant based on the total weight of the sprayable adhesive composition. In some embodiments, the sprayable adhesive composition comprises 25% to 50% by weight of the at least one propellant based on the total weight of the sprayable adhesive composition. In some embodiments, the sprayable adhesive composition comprises 30% to 50% by weight of the at least one propellant based on the total weight of the sprayable adhesive composition. In some embodiments, the sprayable adhesive composition comprises 35% to 50% by weight of the at least one propellant based on the total weight of the sprayable adhesive composition. In some embodiments, the sprayable adhesive composition comprises 40% to 50% by weight of the at least one propellant based on the total weight of the sprayable adhesive composition. In some embodiments, the sprayable adhesive composition comprises 45% to 50% by weight of the at least one propellant based on the total weight of the sprayable adhesive composition.

In some embodiments, the at least one propellant comprises at least one of a propane, a butane, a trans-1,3,3,3-tetrafluoropropene, dimethyl ether, isobutane, n-butane, isopropane, n-propane, nitrogen, oxygen, helium, hydrogen, air, or any combination thereof.

In some embodiments, the sprayable adhesive composition comprises solids.

As used herein, the term "solid(s)" refers to a component of the sprayable adhesive composition other than a solvent and a propellant. In some embodiments, the term "solid(s)" refers to a component present in the sprayable adhesive composition in a non-fluid phase. In some embodiments, a fluid phase comprises at least one of a liquid phase, a gas phase, a vapor phase, or any combination thereof. In some embodiments, the term "solid(s)" refers to a component present in the sprayable adhesive composition in a solid phase.

In some embodiments, the sprayable adhesive composition comprises at least 30% by weight of the solids based on a total weight of the sprayable adhesive composition. In some embodiments, the sprayable adhesive composition comprises at least 35% by weight of the solids based on the total weight of the sprayable adhesive composition. In some embodiments, the sprayable adhesive composition comprises at least 40% by weight of the solids based on the total weight of the sprayable adhesive composition. In some embodiments, the sprayable adhesive composition comprises at least 45% by weight of the solids based on the total weight of the sprayable adhesive composition. In some embodiments, the sprayable adhesive composition comprises at least 50% by weight of the solids based on the total weight of the sprayable adhesive composition. In some embodiments, the sprayable adhesive composition comprises at least 55% by weight of the solids based on the total weight of the sprayable adhesive composition. In some embodiments, the sprayable adhesive composition comprises at least 60% by weight of the solids based on the total weight of the sprayable adhesive composition. In some embodiments, the sprayable adhesive composition comprises at least 65% by weight of the solids based on the total weight of the sprayable adhesive composition. In some embodiments, the sprayable adhesive composition comprises at least 70% by weight of the solids based on the total weight of the sprayable adhesive composition. In some embodiments, the sprayable adhesive composition comprises at least 75% by weight of the solids based on the total weight of the sprayable adhesive composition. In some embodiments, the sprayable adhesive composition comprises at least 80% by weight of the solids based on the total weight of the sprayable adhesive composition. In some embodiments, the sprayable adhesive composition comprises at least 85% by weight of the solids based on the total weight of the sprayable adhesive composition.

In some embodiments, the sprayable adhesive composition comprises 30% to 90% by weight of the solids based on the total weight of the sprayable adhesive composition. In some embodiments, the sprayable adhesive composition comprises 30% to 85% by weight of the solids based on the total weight of the sprayable adhesive composition. In some embodiments, the sprayable adhesive composition comprises 30% to 80% by weight of the solids based on the total weight of the sprayable adhesive composition. In some embodiments, the sprayable adhesive composition comprises 30% to 75% by weight of the solids based on the total weight of the sprayable adhesive composition. In some embodiments, the sprayable adhesive composition comprises 30% to 70% by weight of the solids based on the total weight of the sprayable adhesive composition. In some embodiments, the sprayable adhesive composition comprises 30% to 65% by weight of the solids based on the total weight of the sprayable adhesive composition. In some embodiments, the sprayable adhesive composition comprises 30% to 60% by weight of the solids based on the total weight of the sprayable adhesive composition. In some embodiments, the sprayable adhesive composition comprises 30% to 55% by weight of the solids based on the total weight of the sprayable adhesive composition. In some embodiments, the sprayable adhesive composition comprises 30% to 50% by weight of the solids based on the total weight of the sprayable adhesive composition. In some embodiments, the sprayable adhesive composition comprises 30% to 45% by weight of the solids based on the total weight of the sprayable adhesive composition. In some embodiments, the sprayable adhesive composition comprises 30% to 40% by weight of the solids based on the total weight of the sprayable adhesive composition. In some embodiments, the sprayable adhesive composition comprises 30% to 35% by weight of the solids based on the total weight of the sprayable adhesive composition.

In some embodiments, the sprayable adhesive composition comprises 35% to 90% by weight of the solids based on the total weight of the sprayable adhesive composition. In some embodiments, the sprayable adhesive composition comprises 40% to 90% by weight of the solids based on the total weight of the sprayable adhesive composition. In some embodiments, the sprayable adhesive composition comprises 45% to 90% by weight of the solids based on the total weight of the sprayable adhesive composition. In some embodiments, the sprayable adhesive composition comprises 50% to 90% by weight of the solids based on the total weight of the sprayable adhesive composition. In some embodiments, the sprayable adhesive composition comprises 51% to 90% by weight of the solids based on the total weight of the sprayable adhesive composition. In some embodiments, the sprayable adhesive composition comprises 55% to 90% by weight of the solids based on the total weight of the sprayable adhesive composition. In some embodiments, the sprayable adhesive composition comprises 60% to 90% by weight of the solids based on the total weight of the sprayable adhesive composition. In some embodiments, the sprayable adhesive composition comprises 65% to 90% by weight of the solids based on the total weight of the sprayable adhesive composition. In some embodiments, the sprayable adhesive composition comprises 70% to 90% by weight of the solids based on the total weight of the sprayable adhesive composition. In some embodiments, the sprayable adhesive composition comprises 75% to 90% by weight of the solids based on the total weight of the sprayable adhesive composition. In some embodiments, the sprayable adhesive composition comprises 80% to 90% by weight of the solids based on the total weight of the sprayable adhesive composition. In some embodiments, the sprayable adhesive composition comprises 85% to 90% by weight of the solids based on the total weight of the sprayable adhesive composition.

In some embodiments, the sprayable adhesive composition comprises at least 30% by weight of the solids based on a total weight of the solids and the at least one solvent. In some embodiments, the sprayable adhesive composition comprises at least 35% by weight of the solids based on the total weight of the solids and the at least one solvent. In some embodiments, the sprayable adhesive composition comprises at least 40% by weight of the solids based on the total weight of the solids and the at least one solvent. In some embodiments, the sprayable adhesive composition comprises at least 45% by weight of the solids based on the total weight of the solids and the at least one solvent. In some embodiments, the sprayable adhesive composition comprises at least 50% by weight of the solids based on the total weight of the solids and the at least one solvent. In some embodiments, the sprayable adhesive composition comprises at least 55% by weight of the solids based on the total weight of the solids and the at least one solvent. In some embodiments, the sprayable adhesive composition comprises at least 60% by weight of the solids based on the total weight of the solids and the at least one solvent. In some embodiments, the sprayable adhesive composition comprises at least 65% by weight of the solids based on the total weight of the solids and the at least one solvent. In some embodiments, the sprayable adhesive composition comprises at least 70% by weight of the solids based on the total weight of the solids and the at least one solvent. In some embodiments, the sprayable adhesive composition comprises at least 75% by weight of the solids based on the total weight of the solids and the at least one solvent. In some embodiments, the sprayable adhesive composition comprises at least 80% by weight of the solids based on the total weight of the solids and the at least one solvent. In some embodiments, the sprayable adhesive composition comprises at least 85% by weight of the solids based on the total weight of the solids and the at least one solvent.

In some embodiments, the sprayable adhesive composition comprises 30% to 90% by weight of the solids based on the total weight of the solids and the at least one solvent. In some embodiments, the sprayable adhesive composition comprises 30% to 85% by weight of the solids based on the total weight of the solids and the at least one solvent. In some embodiments, the sprayable adhesive composition comprises 30% to 80% by weight of the solids based on the total weight of the solids and the at least one solvent. In some embodiments, the sprayable adhesive composition comprises 30% to 75% by weight of the solids based on the total weight of the solids and the at least one solvent. In some embodiments, the sprayable adhesive composition comprises 30% to 70% by weight of the solids based on the total weight of the solids and the at least one solvent. In some embodiments, the sprayable adhesive composition comprises 30% to 65% by weight of the solids based on the total weight of the solids and the at least one solvent. In some embodiments, the sprayable adhesive composition comprises 30% to 60% by weight of the solids based on the total weight of the solids and the at least one solvent. In some embodiments, the sprayable adhesive composition comprises 30% to 55% by weight of the solids based on the total weight of the solids and the at least one solvent. In some embodiments, the sprayable adhesive composition comprises 30% to 50% by weight of the solids based on the total weight of the solids and the at least one solvent. In some embodiments, the sprayable adhesive composition comprises 30% to 45% by weight of the solids based on the total weight of the solids and the at least one solvent. In some embodiments, the sprayable adhesive composition comprises 30% to 40% by weight of the solids based on the total weight of the solids and the at least one solvent. In some embodiments, the sprayable adhesive composition comprises 30% to 35% by weight of the solids based on the total weight of the solids and the at least one solvent.

In some embodiments, the sprayable adhesive composition comprises 35% to 90% by weight of the solids based on the total weight of the solids and the at least one solvent. In some embodiments, the sprayable adhesive composition comprises 40% to 90% by weight of the solids based on the total weight of the solids and the at least one solvent. In some embodiments, the sprayable adhesive composition comprises 45% to 90% by weight of the solids based on the total weight of the solids and the at least one solvent. In some embodiments, the sprayable adhesive composition comprises 50% to 90% by weight of the solids based on the total weight of the solids and the at least one solvent. In some embodiments, the sprayable adhesive composition comprises 51% to 90% by weight of the solids based on the total weight of the solids and the at least one solvent. In some embodiments, the sprayable adhesive composition comprises 55% to 90% by weight of the solids based on the total weight of the solids and the at least one solvent. In some embodiments, the sprayable adhesive composition comprises 60% to 90% by weight of the solids based on the total weight of the solids and the at least one solvent. In some embodiments, the sprayable adhesive composition comprises 65% to 90% by weight of the solids based on the total weight of the solids and the at least one solvent. In some embodiments, the sprayable adhesive composition comprises 70% to 90% by weight of the solids based on the total weight of the solids and the at least one solvent. In some embodiments, the sprayable adhesive composition comprises 75% to 90% by weight of the solids based on the total weight of the solids and the at least one solvent. In some embodiments, the sprayable adhesive composition comprises 80% to 90% by weight of the solids based on the total weight of the solids and the at least one solvent. In some embodiments, the sprayable adhesive composition comprises 85% to 90% by weight of the solids based on the total weight of the solids and the at least one solvent.

In some embodiments, the solids comprise at least one of the at least one polymer, the at least one tackifier, the at least one antioxidant, the at least one additive, the at least one colorant, or any combination thereof. In some embodiments, the solids does not comprise at least one of the at least one additives. In some embodiments, the solids does not comprise the at least one colorant.

In some embodiments, the sprayable adhesive composition, before a propellant is added, has a viscosity of 7500 cP or less, when measured at 25° C. using a Brookfield viscometer with a spindle #3 and a viscometer speed of 10 RPM. In some embodiments, the sprayable adhesive composition, before a propellant is added, has a viscosity of 7000 cP or less, when measured at 25° C. using a Brookfield viscometer with a spindle #3 and a viscometer speed of 10 RPM. In some embodiments, the sprayable adhesive composition, before a propellant is added, has a viscosity of 6500 cP or less, when measured at 25° C. using a Brookfield viscometer with a spindle #3 and a viscometer speed of 10 RPM. In some embodiments, the sprayable adhesive composition, before a propellant is added, has a viscosity of 6000 cP or less, when measured at 25° C. using a Brookfield viscometer with a spindle #3 and a viscometer speed of 10 RPM. In some embodiments, the sprayable adhesive composition, before a propellant is added, has a viscosity of 5500 cP or less, when measured at 25° C. using a Brookfield viscometer with a spindle #3 and a viscometer speed of 10 RPM. In some embodiments, the sprayable adhesive composition, before a propellant is added, has a viscosity of 5000 cP or less, when measured at 25° C. using a Brookfield viscometer with a spindle #3 and a viscometer speed of 10 RPM. In some embodiments, the sprayable adhesive composition, before a propellant is added, has a viscosity of 4500 cP or less, when measured at 25° C. using a Brookfield viscometer with a spindle #3 and a viscometer speed of 10 RPM. In some embodiments, the sprayable adhesive composition, before a propellant is added, has a viscosity of 4000 cP or less, when measured at 25° C. using a Brookfield viscometer with a spindle #3 and a viscometer speed of 10 RPM. In some embodiments, the sprayable adhesive composition, before a propellant is added, has a viscosity of 3500 cP or less, when measured at 25° C. using a Brookfield viscometer with a spindle #3 and a viscometer speed of 10 RPM. In some embodiments, the sprayable adhesive composition, before a propellant is added, has a viscosity of 3000 cP or less, when measured at 25° C. using a Brookfield viscometer with a spindle #3 and a viscometer speed of 10 RPM. In some embodiments, the sprayable adhesive composition, before a propellant is added, has a viscosity of 2500 cP or less, when measured at 25° C. using a Brookfield viscometer with a spindle #3 and a viscometer speed of 10 RPM. In some embodiments, the sprayable adhesive composition, before a propellant is added, has a viscosity of 2000 cP or less, when measured at 25° C. using a Brookfield viscometer with a spindle #3 and a viscometer speed of 10 RPM. In some embodiments, the sprayable adhesive composition, before a propellant is added, has a viscosity of 1500 cP or less, when measured at 25° C. using a Brookfield viscometer with a spindle #3 and a viscometer speed of 10 RPM. In some embodiments, the sprayable adhesive composition, before a propellant is added, has a viscosity of 1000 cP or less, when measured at 25° C. using a Brookfield viscometer with a spindle #3 and a viscometer speed of 10 RPM. In some embodiments, the sprayable adhesive composition, before a propellant is added, has a viscosity of 500 cP or less, when measured at 25° C. using a Brookfield viscometer with a spindle #3 and a viscometer speed of 10 RPM.

In some embodiments, the sprayable adhesive composition, before a propellant is added, has a viscosity of 100 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 14,000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 13,000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 12,000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 11,000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 10,000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 9000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 8000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 7000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 6500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 6000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 5500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 5000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 4500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 4000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 3500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 3000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 2500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 2000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 1500 cP, when measured at 25° C. using a Brookfield viscometer with a spindle #3 and a viscometer speed of 10 RPM. In some embodiments, the sprayable adhesive composition, before a propellant is added, has a viscosity of 100 cP to 1000 cP, when measured at 25° C. using a Brookfield viscometer with a spindle #3 and a viscometer speed of 10 RPM. In some embodiments, the sprayable adhesive composition, before a propellant is added, has a viscosity of 100 cP to 500 cP, when measured at 25° C. using a Brookfield viscometer with a spindle #3 and a viscometer speed of 10 RPM.

In some embodiments, the sprayable adhesive composition, before a propellant is added, has a viscosity of 500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 1000 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 1500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 2000 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 2500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 3000 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 3500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 4000 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 4500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 5500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 6000 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 6500 cP to 7500 cP, when measured at 25° C. using a Brookfield viscometer with a spindle #3 and a viscometer speed of 10 RPM. In some embodiments, the sprayable adhesive composition, before a propellant is added, has a viscosity of 7000 cP to 7500 cP, when measured at 25° C. using a Brookfield viscometer with a spindle #3 and a viscometer speed of 10

RPM. In some embodiments, the tackifier is present in an amount sufficient for the sprayable adhesive composition to have any one or more of these viscosities.

In some embodiments, the sprayable adhesive composition, before a propellant is added, has a viscosity of 5000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 14,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 13,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 12,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 11,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 10,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 9,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 8,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 7,000 cP, when measured at 25° C. using a Brookfield viscometer with a spindle #3 and a viscometer speed of 10 RPM. In some embodiments, the sprayable adhesive composition, before a propellant is added, has a viscosity of 5000 cP to 6,000 cP, when measured at 25° C. using a Brookfield viscometer with a spindle #3 and a viscometer speed of 10 RPM.

In some embodiments, the sprayable adhesive composition, before a propellant is added, has a viscosity of 6000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 7000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 8000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 9000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 10,000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 11,000 cP to 15,000 cP, when measured at 25°

C. using a Brookfield viscometer with a spindle #3 and a viscometer speed of 10 RPM. In some embodiments, the sprayable adhesive composition, before a propellant is added, has a viscosity of 12,000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 13,000 cP to 15,000 cP, when measured at 25° C. using a Brookfield viscometer with a spindle #3 and a viscometer speed of 10 RPM. In some embodiments, the sprayable adhesive composition, before a propellant is added, has a viscosity of 14,000 cP to 15,000 cP, when measured at 25° C. using a Brookfield viscometer with a spindle #3 and a viscometer speed of 10 RPM.

At step 106, in some embodiments, the method of installation 100 comprises spraying the sprayable adhesive composition.

As used herein, the term "spray film" refers to a continuous or non-continuous film of a substance having a structure of being sprayed onto a surface. For example, in some embodiments, the adhesive spray film is a continuous film. In some embodiments, the adhesive spray film is a noncontinuous or discontinuous film. In some embodiments, a spray film is a film formed of droplets located on a surface, wherein the droplets can coalesce to form a continuous film. In some embodiments, a spray film is a film formed of droplets located on a surface, wherein, in the absence of complete coalescence, the droplets form a discontinuous film.

As used herein, the term "roofing substrate" comprises at least one of an asphaltic substrate, a plywood substrate, a glass substrate, a cellulosic substrate, an underlayment, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a roofing shingle, a cement board, concrete, a base sheet, a pipe, a chimney, a wax paper, a roof shingle, a mat, a fabric, a glass mat, a fiberglass mat, a woven mat, a nonwoven a fabric, a polyester mat, a scrim, a coated scrim, or any combination thereof.

In some embodiments, the spraying comprises spraying the sprayable adhesive composition onto at least a portion of a roofing substrate, so as to form an adhesive spray film. In some embodiments, the spraying comprises spraying the sprayable adhesive composition onto at least a portion of the roofing substrate, so as to form a first adhesive spray film. In some embodiments, the spraying comprises aerosolizing the sprayable adhesive composition onto at least a portion of the roofing substrate. In some embodiments, the spraying comprises dispensing the sprayable adhesive composition from a spraying device onto at least a portion of the roofing substrate. In some embodiments, the spraying comprises dispensing the sprayable adhesive composition from an aerosol container onto at least a portion of the roofing substrate. In some embodiments, the spraying comprises dispensing droplets of the sprayable adhesive composition onto at least a portion of the roofing substrate. In some embodiments, the spraying comprises dispersing droplets of the sprayable adhesive composition onto at least a portion of the roofing substrate. In some embodiments, the spraying comprises discharging droplets of the sprayable adhesive composition onto at least a portion of the roofing substrate.

In some embodiments, the spraying comprises releasing droplets of the sprayable adhesive composition onto at least a portion of the roofing substrate. In some embodiments, a spray device comprises at least one of an aerosol sprayer, an aerosol container, an aerosol spray pump, a device comprising a spray nozzle, a device comprising a dispenser for spray delivery of the sprayable adhesive composition, an aerosol spray gun, an atomizer device, a manual aerosol sprayer, an automatic aerosol sprayer, or any combination thereof.

In some embodiments, the spraying comprises spraying the sprayable adhesive composition onto at least a portion of the roofing membrane, so as to form an adhesive spray film. In some embodiments, the spraying comprises spraying the sprayable adhesive composition onto at least a portion of the roofing membrane, so as to form a second adhesive spray film. In some embodiments, the spraying comprises aerosolizing the sprayable adhesive composition onto at least a portion of the roofing membrane. In some embodiments, the spraying comprises dispensing the sprayable adhesive composition from a spraying device onto at least a portion of the roofing membrane. In some embodiments, the spraying comprises dispensing the sprayable adhesive composition from an aerosol container onto at least a portion of the roofing membrane. In some embodiments, the spraying comprises dispensing droplets of the sprayable adhesive composition onto at least a portion of the roofing membrane. In some embodiments, the spraying comprises dispersing droplets of the sprayable adhesive composition onto at least a portion of the roofing membrane. In some embodiments, the spraying comprises discharging droplets of the sprayable adhesive composition onto at least a portion of the roofing membrane. In some embodiments, the spraying comprises releasing droplets of the sprayable adhesive composition onto at least a portion of the roofing membrane. In some embodiments, a spray device comprises at least one of an aerosol sprayer, an aerosol container, an aerosol spray pump, a device comprising a spray nozzle, a device comprising a dispenser for spray delivery of the sprayable adhesive composition, an aerosol spray gun, an atomizer device, a manual aerosol sprayer, an automatic aerosol sprayer, or any combination thereof.

In some embodiments, an average particle size of the sprayed adhesive composition is in a range of 0.001 microns to 10 microns. In some embodiments, an average particle size of the sprayed adhesive composition is in a range of 0.001 microns to 9 microns. In some embodiments, an average particle size of the sprayed adhesive composition is in a range of 0.001 microns to 8 microns. In some embodiments, an average particle size of the sprayed adhesive composition is in a range of 0.001 microns to 7 microns. In some embodiments, an average particle size of the sprayed adhesive composition is in a range of 0.001 microns to 6 microns. In some embodiments, an average particle size of the sprayed adhesive composition is in a range of 0.001 microns to 5 microns. In some embodiments, an average particle size of the sprayed adhesive composition is in a range of 0.001 microns to 4 microns. In some embodiments, an average particle size of the sprayed adhesive composition is in a range of 0.001 microns to 3 microns. In some embodiments, an average particle size of the sprayed adhesive composition is in a range of 0.001 microns to 2 microns. In some embodiments, an average particle size of the sprayed adhesive composition is in a range of 0.001 microns to 1 microns. In some embodiments, an average particle size of the sprayed adhesive composition is in a range of 0.001 microns to 0.9 microns. In some embodiments, an average particle size of the sprayed adhesive composition is in a range of 0.001 microns to 0.8 microns. In some embodiments, an average particle size of the sprayed adhesive composition is in a range of 0.001 microns to 0.7 microns. In some embodiments, an average particle size of the sprayed adhesive composition is in a range of 0.001 microns to 0.6 microns. In some embodiments, an average particle size of the sprayed adhesive composition is in a range of 0.001 microns to 0.5 microns. In some embodiments, an average particle size of the sprayed adhesive composition is in a range of 0.001 microns to 0.4 microns. In some embodiments, an average particle size of the sprayed adhesive composition is in a range of 0.001 microns to 0.3 microns. In some embodiments, an average particle size of the sprayed adhesive composition is in a range of 0.001 microns to 0.2 microns. In some embodiments, an average particle size of the sprayed adhesive composition is in a range of 0.001 microns to 0.1 microns. In some embodiments, an average particle size of the sprayed adhesive composition is in a range of 0.001 microns to 0.01 microns.

In some embodiments, an average particle size of the sprayed adhesive composition is in a range of 0.01 microns to 10 microns. In some embodiments, an average particle size of the sprayed adhesive composition is in a range of 0.1 microns to 10 microns. In some embodiments, an average particle size of the sprayed adhesive composition is in a range of 1 microns to 10 microns. In some embodiments, an average particle size of the sprayed adhesive composition is in a range of 2 microns to 10 microns. In some embodiments, an average particle size of the sprayed adhesive composition is in a range of 3 microns to 10 microns. In some embodiments, an average particle size of the sprayed adhesive composition is in a range of 4 microns to 10 microns. In some embodiments, an average particle size of the sprayed adhesive composition is in a range of 5 microns to 10 microns. In some embodiments, an average particle size of the sprayed adhesive composition is in a range of 6 microns to 10 microns. In some embodiments, an average particle size of the sprayed adhesive composition is in a range of 7 microns to 10 microns. In some embodiments, an average particle size of the sprayed adhesive composition is in a range of 8 microns to 10 microns. In some embodiments, an average particle size of the sprayed adhesive composition is in a range of 9 microns to 10 microns.

In some embodiments, the spraying comprises spraying the sprayable adhesive composition onto, for example, a roofing substrate, so as to result in a coverage rate of at least 1000 ft$^2$ per 5 gallons of the sprayable adhesive composition. As used herein, the term "coverage rate" corresponds to the surface area covered by the sprayable adhesive composition when sprayed onto a substrate so as to result in a film having a thickness of 3 mil to 8 mil per a given volume of the sprayable adhesive composition. In some embodiments, the spraying comprises spraying the sprayable adhesive composition onto, for example, a roofing substrate, so as to result in a coverage rate of 1000 ft$^2$ per 5 gallons of the sprayable adhesive composition to 2500 ft$^2$ per 5 gallons of the sprayable adhesive composition. In some embodiments, the spraying comprises spraying the sprayable adhesive composition, so as to result in a coverage rate of 1000 to 2400 ft$^2$ per 5 gallons of the sprayable adhesive composition. In some embodiments, the spraying comprises spraying the sprayable adhesive composition, so as to result in a coverage rate of 1000 to 2300 ft$^2$ per 5 gallons of the sprayable adhesive composition. In some embodiments, the spraying comprises spraying the sprayable adhesive composition, so as to result in a coverage rate of 1000 to 2200 ft$^2$ per 5 gallons of the sprayable adhesive composition. In some embodiments, the spraying comprises spraying the sprayable adhesive composition, so as to result in a coverage rate of 1000 to 2100 ft$^2$ per 5 gallons of the sprayable adhesive composition. In some embodiments, the spraying comprises spraying the sprayable adhesive composition, so as to result in a coverage rate of 1000 to 2000 ft$^2$ per 5 gallons of the sprayable adhesive composition. In some embodiments, the spraying comprises spraying the sprayable adhesive composition, so as to result in a coverage rate of 1000 to 1900 ft$^2$ per 5 gallons of the sprayable adhesive composition. In some embodiments, the spraying comprises spraying the sprayable adhesive composition, so as to result in a coverage rate of 1000 to 1800 ft$^2$ per 5 gallons of the sprayable adhesive composition. In some embodiments, the spraying comprises spraying the sprayable adhesive composition, so as to result in a coverage rate of 1000 to 1700 ft$^2$ per 5 gallons of the sprayable adhesive composition. In some embodiments, the spraying comprises spraying the sprayable adhesive composition, so as to result in a coverage rate of 1000 to 1600 ft$^2$ per 5 gallons of the sprayable adhesive composition. In some embodiments, the spraying comprises spraying the sprayable adhesive composition, so as to result in a coverage rate of 1000 to 1500 ft$^2$ per 5 gallons of the sprayable adhesive composition. In some embodiments, the spraying comprises spraying the sprayable adhesive composition, so as to result in a coverage rate of 1000 to 1400 ft$^2$ per 5 gallons of the sprayable adhesive composition. In some embodiments, the spraying comprises spraying the sprayable adhesive composition, so as to result in a coverage rate of 1000 to 1300 ft$^2$ per 5 gallons of the sprayable adhesive composition. In some embodiments, the spraying comprises spraying the sprayable adhesive composition, so as to result in a coverage rate of 1000 to 1200 ft$^2$ per 5 gallons of the sprayable adhesive composition. In some embodiments, the spraying comprises spraying the sprayable adhesive composition, so as to result in a coverage rate of 1000 to 1100 ft$^2$ per 5 gallons of the sprayable adhesive composition.

In some embodiments, the spraying comprises spraying the sprayable adhesive composition, so as to result in a coverage rate of 1100 to 2500 ft$^2$ per 5 gallons of the sprayable adhesive composition. In some embodiments, the spraying comprises spraying the sprayable adhesive composition, so as to result in a coverage rate of 1200 to 2500 ft$^2$ per 5 gallons of the sprayable adhesive composition. In some embodiments, the spraying comprises spraying the sprayable adhesive composition, so as to result in a coverage rate of 1300 to 2500 ft$^2$ per 5 gallons of the sprayable adhesive composition. In some embodiments, the spraying comprises spraying the sprayable adhesive composition, so as to result in a coverage rate of 1400 to 2500 ft$^2$ per 5 gallons of the sprayable adhesive composition. In some embodiments, the spraying comprises spraying the sprayable adhesive composition, so as to result in a coverage rate of 1500 to 2500 ft$^2$ per 5 gallons of the sprayable adhesive composition. In some embodiments, the spraying comprises spraying the sprayable adhesive composition, so as to result in a coverage rate of 1600 to 2500 ft$^2$ per 5 gallons of the sprayable adhesive composition. In some embodiments, the spraying comprises spraying the sprayable adhesive composition, so as to result in a coverage rate of 1700 to 2500 ft$^2$ per 5 gallons of the sprayable adhesive composition. In some embodiments, the spraying comprises spraying the sprayable adhesive composition, so as to result in a coverage rate of 1800 to 2500 ft$^2$ per 5 gallons of the sprayable adhesive composition. In some embodiments, the spraying comprises spraying the sprayable adhesive composition, so as to result in a coverage rate of 1900 to 2500 ft$^2$ per 5 gallons of the sprayable adhesive composition. In some embodiments, the spraying comprises spraying the sprayable adhesive composition, so as to result in a coverage rate of 2000 to 2500 ft$^2$ per 5 gallons of the sprayable adhesive composition. In some embodiments, the spraying comprises spraying the sprayable adhesive composition, so as to result in a coverage rate of 2100 to 2500 ft$^2$ per 5 gallons of the sprayable adhesive composition. In some embodiments, the spraying comprises spraying the sprayable adhesive composition, so as to result in a coverage rate of 2200 to 2500 ft$^2$ per 5 gallons of the sprayable adhesive composition. In some embodiments, the spraying comprises spraying the sprayable adhesive composition, so as to result in a coverage rate of 2300 to 2500 ft$^2$ per 5 gallons of the sprayable adhesive composition. In some embodiments, the spraying comprises spraying the sprayable adhesive composition, so as to result in a coverage rate of 2400 to 2500 ft$^2$ per 5 gallons of the sprayable adhesive composition.

In some embodiments, the spray pattern is an overlapping spray pattern. As used herein, an overlapping spray pattern comprises an application method in which the sprayable adhesive composition is sprayed so as to form a first adhesive spray film that overlaps, or covers, a second adhesive spray film located on a substrate. In some embodiments, the second adhesive spray film comprises the sprayable adhesive composition. In some embodiments, the first adhesive spray film comprises the sprayable adhesive composition. In some embodiments, the second adhesive spray film overlaps 1% to 50% of the first adhesive spray film. In some embodiments, the second adhesive spray film overlaps 1% to 50% of the first adhesive spray film. In some embodiments, the second adhesive spray film overlaps 1% to 40% of the first adhesive spray film. In some embodiments, the second adhesive spray film overlaps 1% to 30% of the first adhesive spray film. In some embodiments, the second adhesive spray film overlaps 1% to 20% of the first adhesive spray film. In some embodiments, the second adhesive spray film overlaps 1% to 10% of the first adhesive spray film. In some embodiments, the second adhesive spray film overlaps 10% to 50% of the first adhesive spray film. In some embodiments, the second adhesive spray film overlaps 20% to 50% of the first adhesive spray film. In some embodiments, the second adhesive spray film overlaps 30% to 50% of the first adhesive spray film. In some embodiments, the second adhesive spray film overlaps 40% to 50% of the first adhesive spray film.

In some embodiments, the spray pattern is not an overlapping spray pattern. For example, in some embodiments, the first adhesive spray film is located adjacent to the second adhesive spray film. In some embodiments, the first adhesive spray film abuts the second adhesive spray film. In some embodiments, the spray pattern is substantially free of an overlapping spray pattern. For example, in some embodiments, the second adhesive spray film overlaps 1% to 5% of the first adhesive spray film. In some embodiments, the second adhesive spray film overlaps 1% to 4% of the first adhesive spray film. In some embodiments, the second adhesive spray film overlaps 1% to 3% of the first adhesive spray film. In some embodiments, the second adhesive spray film overlaps 1% to 2% of the first adhesive spray film. In some embodiments, the second adhesive spray film overlaps 2% to 5% of the first adhesive spray film. In some embodiments, the second adhesive spray film overlaps 3% to 5% of the first adhesive spray film. In some embodiments, the second adhesive spray film overlaps 4% to 5% of the first adhesive spray film.

In some embodiments, the spray pattern is free of an overlapping spray pattern. For example, in some embodiments, the second adhesive spray film overlaps 0.1% to 1% of the first adhesive spray film. In some embodiments, the second adhesive spray film overlaps 0.1% to 0.9% of the first adhesive spray film. In some embodiments, the second adhesive spray film overlaps 0.1% to 0.8% of the first adhesive spray film. In some embodiments, the second adhesive spray film overlaps 0.1% to 0.7% of the first adhesive spray film. In some embodiments, the second adhesive spray film overlaps 0.1% to 0.6% of the first adhesive spray film. In some embodiments, the second adhesive spray film overlaps 0.1% to 0.5% of the first adhesive spray film. In some embodiments, the second adhesive spray film overlaps 0.1% to 0.4% of the first adhesive spray film. In some embodiments, the second adhesive spray film overlaps 0.1% to 0.3% of the first adhesive spray film. In some embodiments, the second adhesive spray film overlaps 0.1% to 0.2% of the first adhesive spray film.

In some embodiments, the second adhesive spray film overlaps 0.2% to 1% of the first adhesive spray film. In some embodiments, the second adhesive spray film overlaps 0.3% to 1% of the first adhesive spray film. In some embodiments, the second adhesive spray film overlaps 0.4% to 1% of the first adhesive spray film. In some embodiments, the second adhesive spray film overlaps 0.5% to 1% of the first adhesive spray film. In some embodiments, the second adhesive spray film overlaps 0.6% to 1% of the first adhesive spray film. In some embodiments, the second adhesive spray film overlaps 0.7% to 1% of the first adhesive spray film. In some embodiments, the second adhesive spray film overlaps 0.8% to 1% of the first adhesive spray film. In some embodiments, the second adhesive spray film overlaps 0.9% to 1% of the first adhesive spray film.

In some embodiments, the adhesive spray film covers 1% to 99% of the roofing substrate. In some embodiments, the adhesive spray film covers 1% to 95% of the roofing substrate. In some embodiments, the adhesive spray film covers 1% to 90% of the roofing substrate. In some embodiments, the adhesive spray film covers 1% to 85% of the roofing substrate. In some embodiments, the adhesive spray film covers 1% to 80% of the roofing substrate. In some embodiments, the adhesive spray film covers 1% to 75% of the roofing substrate. In some embodiments, the adhesive spray film covers 1% to 70% of the roofing substrate. In some embodiments, the adhesive spray film covers 1% to 65% of the roofing substrate. In some embodiments, the adhesive spray film covers 1% to 60% of the roofing substrate. In some embodiments, the adhesive spray film covers 1% to 55% of the roofing substrate. In some embodiments, the adhesive spray film covers 1% to 50% of the roofing substrate. In some embodiments, the adhesive spray film covers 1% to 45% of the roofing substrate. In some embodiments, the adhesive spray film covers 1% to 40% of the roofing substrate. In some embodiments, the adhesive spray film covers 1% to 35% of the roofing substrate. In some embodiments, the adhesive spray film covers 1% to 30% of the roofing substrate. In some embodiments, the adhesive spray film covers 1% to 25% of the roofing substrate. In some embodiments, the adhesive spray film covers 1% to 20% of the roofing substrate. In some embodiments, the adhesive spray film covers 1% to 15% of the roofing substrate. In some embodiments, the adhesive spray film covers 1% to 10% of the roofing substrate. In some embodiments, the adhesive spray film covers 1% to 5% of the roofing substrate.

In some embodiments, the adhesive spray film covers 5% to 99% of the roofing substrate. In some embodiments, the adhesive spray film covers 10% to 99% of the roofing substrate. In some embodiments, the adhesive spray film covers 15% to 99% of the roofing substrate. In some embodiments, the adhesive spray film covers 20% to 99% of the roofing substrate. In some embodiments, the adhesive spray film covers 25% to 99% of the roofing substrate. In some embodiments, the adhesive spray film covers 30% to 99% of the roofing substrate. In some embodiments, the adhesive spray film covers 35% to 99% of the roofing substrate. In some embodiments, the adhesive spray film covers 40% to 99% of the roofing substrate. In some embodiments, the adhesive spray film covers 45% to 99% of the roofing substrate. In some embodiments, the adhesive spray film covers 50% to 99% of the roofing substrate. In some embodiments, the adhesive spray film covers 55% to 99% of the roofing substrate. In some embodiments, the adhesive spray film covers 60% to 99% of the roofing substrate. In some embodiments, the adhesive spray film covers 65% to 99% of the roofing substrate. In some embodiments, the adhesive spray film covers 70% to 99% of the roofing substrate. In some embodiments, the adhesive spray film covers 75% to 99% of the roofing substrate. In some embodiments, the adhesive spray film covers 80% to 99% of the roofing substrate. In some embodiments, the adhesive spray film covers 85% to 99% of the roofing substrate. In some embodiments, the adhesive spray film covers 90% to 99% of the roofing substrate. In some embodiments, the adhesive spray film covers 95% to 99% of the roofing substrate. In some embodiments, the adhesive spray film covers the roofing substrate in its entirety.

In some embodiments, the adhesive spray film covers 1% to 99% of the roofing membrane. In some embodiments, the adhesive spray film covers 1% to 95% of the roofing membrane. In some embodiments, the adhesive spray film covers 1% to 90% of the roofing membrane. In some embodiments, the adhesive spray film covers 1% to 85% of the roofing membrane. In some embodiments, the adhesive spray film covers 1% to 80% of the roofing membrane. In some embodiments, the adhesive spray film covers 1% to 75% of the roofing membrane. In some embodiments, the adhesive spray film covers 1% to 70% of the roofing membrane. In some embodiments, the adhesive spray film covers 1% to 65% of the roofing membrane. In some embodiments, the adhesive spray film covers 1% to 60% of the roofing membrane. In some embodiments, the adhesive spray film covers 1% to 55% of the roofing membrane. In some embodiments, the adhesive spray film covers 1% to 50% of the roofing membrane. In some embodiments, the adhesive spray film covers 1% to 45% of the roofing membrane. In some embodiments, the adhesive spray film covers 1% to 40% of the roofing membrane. In some embodiments, the adhesive spray film covers 1% to 35% of the roofing membrane. In some embodiments, the adhesive spray film covers 1% to 30% of the roofing membrane. In some embodiments, the adhesive spray film covers 1% to 25% of the roofing membrane. In some embodiments, the adhesive spray film covers 1% to 20% of the roofing membrane. In some embodiments, the adhesive spray film covers 1% to 15% of the roofing membrane. In some embodiments, the adhesive spray film covers 1% to 10% of the roofing membrane. In some embodiments, the adhesive spray film covers 1% to 5% of the roofing membrane.

In some embodiments, the adhesive spray film covers 5% to 99% of the roofing membrane. In some embodiments, the adhesive spray film covers 10% to 99% of the roofing membrane. In some embodiments, the adhesive spray film covers 15% to 99% of the roofing membrane. In some embodiments, the adhesive spray film covers 20% to 99% of the roofing membrane. In some embodiments, the adhesive spray film covers 25% to 99% of the roofing membrane. In some embodiments, the adhesive spray film covers 30% to 99% of the roofing membrane. In some embodiments, the adhesive spray film covers 35% to 99% of the roofing membrane. In some embodiments, the adhesive spray film covers 40% to 99% of the roofing membrane. In some embodiments, the adhesive spray film covers 45% to 99% of the roofing membrane. In some embodiments, the adhesive spray film covers 50% to 99% of the roofing membrane. In some embodiments, the adhesive spray film covers 55% to 99% of the roofing membrane. In some embodiments, the adhesive spray film covers 60% to 99% of the roofing membrane. In some embodiments, the adhesive spray film covers 65% to 99% of the roofing membrane. In some embodiments, the adhesive spray film covers 70% to 99% of the roofing membrane. In some embodiments, the adhesive spray film covers 75% to 99% of the roofing membrane. In some embodiments, the adhesive spray film covers 80% to 99% of the roofing membrane. In some embodiments, the adhesive spray film covers 85% to 99% of the roofing membrane. In some embodiments, the adhesive spray film covers 90% to 99% of the roofing membrane. In some embodiments, the adhesive spray film covers 95% to 99% of the roofing membrane. In some embodiments, the adhesive spray film covers the roofing membrane in its entirety.

In some embodiments, the adhesive spray film directly contacts at least a portion of the roofing substrate. In some embodiments, the adhesive spray film is bonded to at least a portion of the roofing substrate. In some embodiments, the adhesive spray film is adhered to at least a portion of the roofing substrate. In some embodiments, the adhesive spray film covers at least a portion of the roofing substrate.

In some embodiments, the adhesive spray film directly contacts at least a portion of the roofing membrane. In some embodiments, the adhesive spray film is bonded to at least a portion of the roofing membrane. In some embodiments, the adhesive spray film is adhered to at least a portion of the roofing membrane. In some embodiments, the adhesive spray film covers at least a portion of the roofing membrane.

In some embodiments, the adhesive spray film has a thickness of 1 mil to 10 mils. In some embodiments, the adhesive spray film has a thickness of 1 mil to 9.5 mils. In some embodiments, the adhesive spray film has a thickness of 1 mil to 9 mils. In some embodiments, the adhesive spray film has a thickness of 1 mil to 8.5 mils. In some embodiments, the adhesive spray film has a thickness of 1 mil to 8 mils. In some embodiments, the adhesive spray film has a thickness of 1 mil to 7.5 mils. In some embodiments, the adhesive spray film has a thickness of 1 mil to 7 mils. In some embodiments, the adhesive spray film has a thickness of 1 mil to 6.5 mils. In some embodiments, the adhesive spray film has a thickness of 1 mil to 6 mils. In some embodiments, the adhesive spray film has a thickness of 1 mil to 5.5 mils. In some embodiments, the adhesive spray film has a thickness of 1 mil to 5 mils. In some embodiments, the adhesive spray film has a thickness of 1 mil to 4.5 mils. In some embodiments, the adhesive spray film has a thickness of 1 mil to 4 mils. In some embodiments, the adhesive spray film has a thickness of 1 mil to 3.5 mils. In some embodiments, the adhesive spray film has a thickness of 1 mil to 3 mils. In some embodiments, the adhesive spray film has a thickness of 1 mil to 2.5 mils. In some embodiments, the adhesive spray film has a thickness of 1 mil to 2 mils. In some embodiments, the adhesive spray film has a thickness of 1 mil to 1.5 mils.

In some embodiments, the adhesive spray film has a thickness of 1.5 mil to 10 mils. In some embodiments, the adhesive spray film has a thickness of 2 mil to 10 mils. In some embodiments, the adhesive spray film has a thickness of 2.5 mil to 10 mils. In some embodiments, the adhesive spray film has a thickness of 3 mil to 10 mils. In some embodiments, the adhesive spray film has a thickness of 3.5 mil to 10 mils. In some embodiments, the adhesive spray film has a thickness of 4 mil to 10 mils. In some embodiments, the adhesive spray film has a thickness of 4.5 mil to 10 mils. In some embodiments, the adhesive spray film has a thickness of 5 mil to 10 mils. In some embodiments, the adhesive spray film has a thickness of 5.5 mil to 10 mils. In some embodiments, the adhesive spray film has a thickness of 6 mil to 10 mils. In some embodiments, the adhesive spray film has a thickness of 6.5 mil to 10 mils. In some embodiments, the adhesive spray film has a thickness of 7 mil to 10 mils. In some embodiments, the adhesive spray film has a thickness of 7.5 mil to 10 mils. In some embodiments, the adhesive spray film has a thickness of 8 mil to 10 mils. In some embodiments, the adhesive spray film has a thickness of 8.5 mil to 10 mils. In some embodiments, the adhesive spray film has a thickness of 9 mil to 10 mils. In some embodiments, the adhesive spray film has a thickness of 9.5 mil to 10 mils.

In some embodiments, the adhesive spray film has a thickness of 1 mil to 5 mils. In some embodiments, the adhesive spray film has a thickness of 1 mil to 4.8 mils. In some embodiments, the adhesive spray film has a thickness of 1 mil to 4.6 mils. In some embodiments, the adhesive spray film has a thickness of 1 mil to 4.4 mils. In some embodiments, the adhesive spray film has a thickness of 1 mil to 4.2 mils. In some embodiments, the adhesive spray film has a thickness of 1 mil to 4 mils. In some embodiments, the adhesive spray film has a thickness of 1 mil to 3.8 mils. In some embodiments, the adhesive spray film has a thickness of 1 mil to 3.6 mils. In some embodiments, the adhesive spray film has a thickness of 1 mil to 3.4 mils. In some embodiments, the adhesive spray film has a thickness of 1 mil to 3.2 mils. In some embodiments, the adhesive spray film has a thickness of 1 mil to 3 mils. In some embodiments, the adhesive spray film has a thickness of 1 mil to 2.8 mils. In some embodiments, the adhesive spray film has a thickness of 1 mil to 2.6 mils. In some embodiments, the adhesive spray film has a thickness of 1 mil to 2.4 mils. In some embodiments, the adhesive spray film has a thickness of 1 mil to 2.2 mils. In some embodiments, the adhesive spray film has a thickness of 1 mil to 2 mils. In some embodiments, the adhesive spray film has a thickness of 1 mil to 1.8 mils. In some embodiments, the adhesive spray film has a thickness of 1 mil to 1.6 mils. In some embodiments, the adhesive spray film has a thickness of 1 mil to 1.4 mils. In some embodiments, the adhesive spray film has a thickness of 1 mil to 1.2 mils.

In some embodiments, the adhesive spray film has a thickness of 1.2 mil to 5 mils. In some embodiments, the adhesive spray film has a thickness of 1.4 mil to 5 mils. In some embodiments, the adhesive spray film has a thickness of 1.6 mil to 5 mils. In some embodiments, the adhesive spray film has a thickness of 1.8 mil to 5 mils. In some embodiments, the adhesive spray film has a thickness of 2 mil to 5 mils. In some embodiments, the adhesive spray film has a thickness of 2.2 mil to 5 mils. In some embodiments, the adhesive spray film has a thickness of 2.4 mil to 5 mils.

In some embodiments, the adhesive spray film has a thickness of 2.6 mil to 5 mils. In some embodiments, the adhesive spray film has a thickness of 2.8 mil to 5 mils. In some embodiments, the adhesive spray film has a thickness of 3 mil to 5 mils. In some embodiments, the adhesive spray film has a thickness of 3.2 mil to 5 mils. In some embodiments, the adhesive spray film has a thickness of 3.4 mil to 5 mils. In some embodiments, the adhesive spray film has a thickness of 3.6 mil to 5 mils. In some embodiments, the adhesive spray film has a thickness of 3.8 mil to 5 mils. In some embodiments, the adhesive spray film has a thickness of 4 mil to 5 mils. In some embodiments, the adhesive spray film has a thickness of 4.2 mil to 5 mils. In some embodiments, the adhesive spray film has a thickness of 4.4 mil to 5 mils. In some embodiments, the adhesive spray film has a thickness of 4.6 mil to 5 mils. In some embodiments, the adhesive spray film has a thickness of 4.8 mil to 5 mils.

At step 108, in some embodiments, the method of installation 100 comprises applying the membrane to the roofing substrate.

In some embodiments, the applying comprises applying the roofing membrane to the roofing substrate. In some embodiments, the applying comprises contacting the roofing membrane to the roofing substrate. In some embodiments, the applying comprises securing the roofing membrane to the roofing substrate. In some embodiments, the applying comprises adhering the roofing membrane to the roofing substrate. In some embodiments, the applying comprises bonding the roofing membrane to the roofing substrate. In some embodiments, the applying comprises covering the roofing substrate with the roofing membrane. In some embodiments, the applying comprises applying pressure to the roofing membrane. In some embodiments, the applying comprises pressing the roofing membrane into the roofing substrate. In some embodiments, the applying comprises rolling the roofing membrane onto the roofing substrate. In some embodiments, the applying comprises brushing the roofing membrane onto the roofing substrate. In some embodiments, the applying is performed such that the roofing membrane is bonded to the roofing substrate by the adhesive spray film. In some embodiments, the applying is performed such that the roofing membrane is bonded to the roofing substrate by the first adhesive spray film. In some embodiments, the applying is performed such that the roofing membrane is bonded to the roofing substrate by the second adhesive spray film. In some embodiments, the applying is performed such that the roofing membrane is bonded to the roofing substrate by the first adhesive spray film and the second adhesive spray film. In some embodiments, the applying is performed using at least one of a roller, a brush, a sprayer, a trowel, a coater, a similar tool, or any combination thereof.

In some embodiments, the roofing membrane has a surface energy of 40 mN/m or less. In some embodiments, the roofing membrane has a surface energy of 1 mN/m to 40 mN/m. In some embodiments, the roofing membrane has a surface energy of 1 mN/m to 35 mN/m. In some embodiments, the roofing membrane has a surface energy of 1 mN/m to 30 mN/m. In some embodiments, the roofing membrane has a surface energy of 1 mN/m to 25 mN/m. In some embodiments, the roofing membrane has a surface energy of 1 mN/m to 20 mN/m. In some embodiments, the roofing membrane has a surface energy of 1 mN/m to 15 mN/m. In some embodiments, the roofing membrane has a surface energy of 1 mN/m to 10 mN/m. In some embodiments, the roofing membrane has a surface energy of 1 mN/m to 5 mN/m.

In some embodiments, the roofing membrane has a surface energy of 5 mN/m to 40 mN/m. In some embodiments, the roofing membrane has a surface energy of 10 mN/m to 40 mN/m. In some embodiments, the roofing membrane has a surface energy of 15 mN/m to 40 mN/m. In some embodiments, the roofing membrane has a surface energy of 20 mN/m to 40 mN/m. In some embodiments, the roofing membrane has a surface energy of 25 mN/m to 40 mN/m. In some embodiments, the roofing membrane has a surface energy of 30 mN/m to 40 mN/m. In some embodiments, the roofing membrane has a surface energy of 35 mN/m to 40 mN/m.

In some embodiments, the roofing substrate has a surface energy that is different from a surface energy of the roofing membrane. In some embodiments, the roofing substrate has a surface energy of at least 40 mN/m. For example, in some embodiments, the roofing substrate has a surface energy of 41 mN/m to 500 mN/m. In some embodiments, the roofing substrate has a surface energy of 45 mN/m to 500 mN/m. In some embodiments, the roofing substrate has a surface energy of 50 mN/m to 500 mN/m. In some embodiments, the roofing substrate has a surface energy of 55 mN/m to 500 mN/m. In some embodiments, the roofing substrate has a surface energy of 60 mN/m to 500 mN/m. In some embodiments, the roofing substrate has a surface energy of 65 mN/m to 500 mN/m. In some embodiments, the roofing substrate has a surface energy of 70 mN/m to 500 mN/m. In some embodiments, the roofing substrate has a surface energy of 75 mN/m to 500 mN/m. In some embodiments, the roofing substrate has a surface energy of 100 mN/m to 500 mN/m. In some embodiments, the roofing substrate has a surface energy of 150 mN/m to 500 mN/m. In some embodiments, the roofing substrate has a surface energy of 200 mN/m to 500 mN/m. In some embodiments, the roofing substrate has a surface energy of 250 mN/m to 500 mN/m. In some embodiments, the roofing substrate has a surface energy of 300 mN/m to 500 mN/m. In some embodiments, the roofing substrate has a surface energy of 350 mN/m to 500 mN/m. In some embodiments, the roofing substrate has a surface energy of 400 mN/m to 500 mN/m. In some embodiments, the roofing substrate has a surface energy of 450 mN/m to 500 mN/m. In some embodiments, the roofing substrate has a surface energy of 150 mN/m to 350 mN/m. In some embodiments, the roofing substrate has a surface energy of 200 mN/m to 300 mN/m.

Figure 2:
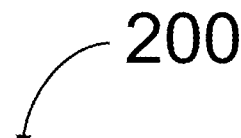
FIG. 2 is a schematic diagram of a cross-sectional view of a system, according to some embodiments.
Figure 2:
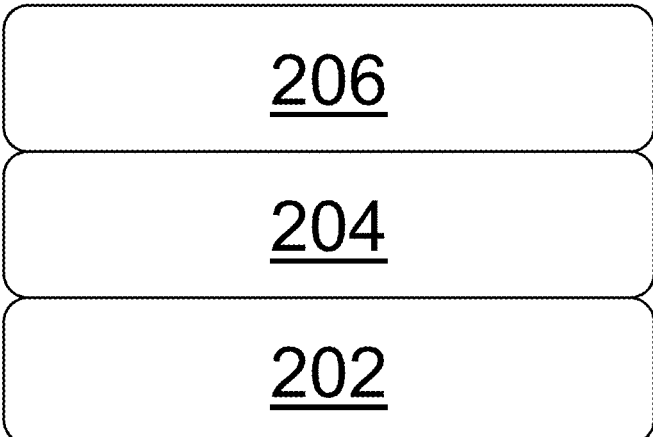

FIG. 2 is a schematic diagram of a cross-sectional view of a system 200, according to some embodiments. As shown in FIG. 2, in some embodiments, the system 200 comprises a roofing substrate 202. In some embodiments, the system 200 comprises a solidified adhesive spray film 204. In some embodiments, the system 200 comprises a roofing membrane 206. In some embodiments, the solidified adhesive spray film 204 is located between the roofing substrate 202 and the roofing membrane 206. In some embodiments, the solidified adhesive spray film 204 bonds the roofing membrane 206 to the roofing substrate 202. In some embodiments, the roofing substrate 202 directly contacts the solidified adhesive spray film 204. In some embodiments, the roofing membrane 206 directly contacts the solidified adhesive spray film 204. In some embodiments, the solidified adhesive spray film 204 comprises the solids of the sprayable adhesive composition. In some embodiments, for example, the solidified adhesive spray 204 comprises the at least one polymer, the at least one tackifier, the at least one antioxidant, the at least one additive, the at least one colorant, or any combination thereof. In some embodiments, the solidified adhesive spray film does not comprise the at least one propellant. In some embodiments, the solidified adhesive spray film does not comprise the at least one solvent. In some embodiments, when the solidified adhesive spray film is obtained from the non-reactive sprayable adhesive composition, the solidified adhesive spray film comprises a non-crosslinked polymer.

In some embodiments, the solidified adhesive spray film comprises 10% to 90% by weight of the at least one polymer based on a total weight of the solidified adhesive spray film. In some embodiments, the solidified adhesive spray film comprises 10% to 85% by weight of the at least one polymer based on the total weight of the solidified adhesive spray film. In some embodiments, the solidified adhesive spray film comprises 10% to 80% by weight of the at least one polymer based on the total weight of the solidified adhesive spray film. In some embodiments, the solidified adhesive spray film comprises 10% to 75% by weight of the at least one polymer based on the total weight of the solidified adhesive spray film. In some embodiments, the solidified adhesive spray film comprises 10% to 70% by weight of the at least one polymer based on the total weight of the solidified adhesive spray film. In some embodiments, the solidified adhesive spray film comprises 10% to 65% by weight of the at least one polymer based on the total weight of the solidified adhesive spray film. In some embodiments, the solidified adhesive spray film comprises 10% to 60% by weight of the at least one polymer based on the total weight of the solidified adhesive spray film. In some embodiments, the solidified adhesive spray film comprises 10% to 55% by weight of the at least one polymer based on the total weight of the solidified adhesive spray film. In some embodiments, the solidified adhesive spray film comprises 10% to 50% by weight of the at least one polymer based on the total weight of the solidified adhesive spray film. In some embodiments, the solidified adhesive spray film comprises 10% to 45% by weight of the at least one polymer based on the total weight of the solidified adhesive spray film. In some embodiments, the solidified adhesive spray film comprises 10% to 40% by weight of the at least one polymer based on the total weight of the solidified adhesive spray film. In some embodiments, the solidified adhesive spray film comprises 10% to 35% by weight of the at least one polymer based on the total weight of the solidified adhesive spray film. In some embodiments, the solidified adhesive spray film comprises 10% to 30% by weight of the at least one polymer based on the total weight of the solidified adhesive spray film. In some embodiments, the solidified adhesive spray film comprises 10% to 25% by weight of the at least one polymer based on the total weight of the solidified adhesive spray film. In some embodiments, the solidified adhesive spray film comprises 10% to 20% by weight of the at least one polymer based on the total weight of the solidified adhesive spray film. In some embodiments, the solidified adhesive spray film comprises 10% to 15% by weight of the at least one polymer based on the total weight of the solidified adhesive spray film.

In some embodiments, the solidified adhesive spray film comprises 15% to 90% by weight of the at least one polymer based on the total weight of the solidified adhesive spray film. In some embodiments, the solidified adhesive spray film comprises 20% to 90% by weight of the at least one polymer based on the total weight of the solidified adhesive spray film. In some embodiments, the solidified adhesive spray film comprises 25% to 90% by weight of the at least one polymer based on the total weight of the solidified adhesive spray film. In some embodiments, the solidified adhesive spray film comprises 30% to 90% by weight of the at least one polymer based on the total weight of the solidified adhesive spray film. In some embodiments, the solidified adhesive spray film comprises 35% to 90% by weight of the at least one polymer based on the total weight of the solidified adhesive spray film. In some embodiments, the solidified adhesive spray film comprises 40% to 90% by weight of the at least one polymer based on the total weight of the solidified adhesive spray film. In some embodiments, the solidified adhesive spray film comprises 45% to 90% by weight of the at least one polymer based on the total weight of the solidified adhesive spray film. In some embodiments, the solidified adhesive spray film comprises 50% to 90% by weight of the at least one polymer based on the total weight of the solidified adhesive spray film. In some embodiments, the solidified adhesive spray film comprises 55% to 90% by weight of the at least one polymer based on the total weight of the solidified adhesive spray film. In some embodiments, the solidified adhesive spray film comprises 60% to 90% by weight of the at least one polymer based on the total weight of the solidified adhesive spray film. In some embodiments, the solidified adhesive spray film comprises 65% to 90% by weight of the at least one polymer based on the total weight of the solidified adhesive spray film. In some embodiments, the solidified adhesive spray film comprises 70% to 90% by weight of the at least one polymer based on the total weight of the solidified adhesive spray film. In some embodiments, the solidified adhesive spray film comprises 75% to 90% by weight of the at least one polymer based on the total weight of the solidified adhesive spray film. In some embodiments, the solidified adhesive spray film comprises 80% to 90% by weight of the at least one polymer based on the total weight of the solidified adhesive spray film. In some embodiments, the solidified adhesive spray film comprises 85% to 90% by weight of the at least one polymer based on the total weight of the solidified adhesive spray film.

In some embodiments, the solidified adhesive spray film comprises 10% to 90% by weight of the at least one tackifier based on a total weight of the solidified adhesive spray film. In some embodiments, the solidified adhesive spray film comprises 10% to 85% by weight of the at least one tackifier based on the total weight of the solidified adhesive spray film. In some embodiments, the solidified adhesive spray film comprises 10% to 80% by weight of the at least one tackifier based on the total weight of the solidified adhesive spray film. In some embodiments, the solidified adhesive spray film comprises 10% to 75% by weight of the at least one tackifier based on the total weight of the solidified adhesive spray film. In some embodiments, the solidified adhesive spray film comprises 10% to 70% by weight of the at least one tackifier based on the total weight of the solidified adhesive spray film. In some embodiments, the solidified adhesive spray film comprises 10% to 65% by weight of the at least one tackifier based on the total weight of the solidified adhesive spray film. In some embodiments, the solidified adhesive spray film comprises 10% to 60% by weight of the at least one tackifier based on the total weight of the solidified adhesive spray film. In some embodiments, the solidified adhesive spray film comprises 10% to 55% by weight of the at least one tackifier based on the total weight of the solidified adhesive spray film. In some embodiments, the solidified adhesive spray film comprises 10% to 50% by weight of the at least one tackifier based on the total weight of the solidified adhesive spray film. In some embodiments, the solidified adhesive spray film comprises 10% to 45% by weight of the at least one tackifier based on the total weight of the solidified adhesive spray film. In some embodiments, the solidified adhesive spray film comprises 10% to 40% by weight of the at least one tackifier based on the total weight of the solidified adhesive spray film. In some embodiments, the solidified adhesive spray film comprises 10% to 35% by weight of the at least one tackifier based on the total weight of the solidified adhesive spray film. In some embodiments, the solidified adhesive spray film comprises 10% to 30% by weight of the at least one tackifier based on the total weight of the solidified adhesive spray film. In some embodiments, the solidified adhesive spray film comprises 10% to 25% by weight of the at least one tackifier based on the total weight of the solidified adhesive spray film. In some embodiments, the solidified adhesive spray film comprises 10% to 20% by weight of the at least one tackifier based on the total weight of the solidified adhesive spray film. In some embodiments, the solidified adhesive spray film comprises 10% to 15% by weight of the at least one tackifier based on the total weight of the solidified adhesive spray film.

In some embodiments, the solidified adhesive spray film comprises 15% to 90% by weight of the at least one tackifier based on the total weight of the solidified adhesive spray film. In some embodiments, the solidified adhesive spray film comprises 20% to 90% by weight of the at least one tackifier based on the total weight of the solidified adhesive spray film. In some embodiments, the solidified adhesive spray film comprises 25% to 90% by weight of the at least one tackifier based on the total weight of the solidified adhesive spray film. In some embodiments, the solidified adhesive spray film comprises 30% to 90% by weight of the at least one tackifier based on the total weight of the solidified adhesive spray film. In some embodiments, the solidified adhesive spray film comprises 35% to 90% by weight of the at least one tackifier based on the total weight of the solidified adhesive spray film. In some embodiments, the solidified adhesive spray film comprises 40% to 90% by weight of the at least one tackifier based on the total weight of the solidified adhesive spray film. In some embodiments, the solidified adhesive spray film comprises 45% to 90% by weight of the at least one tackifier based on the total weight of the solidified adhesive spray film. In some embodiments, the solidified adhesive spray film comprises 50% to 90% by weight of the at least one tackifier based on the total weight of the solidified adhesive spray film. In some embodiments, the solidified adhesive spray film comprises 55% to 90% by weight of the at least one tackifier based on the total weight of the solidified adhesive spray film. In some embodiments, the solidified adhesive spray film comprises 60% to 90% by weight of the at least one tackifier based on the total weight of the solidified adhesive spray film. In some embodiments, the solidified adhesive spray film comprises 65% to 90% by weight of the at least one tackifier based on the total weight of the solidified adhesive spray film. In some embodiments, the solidified adhesive spray film comprises 70% to 90% by weight of the at least one tackifier based on the total weight of the solidified adhesive spray film. In some embodiments, the solidified adhesive spray film comprises 75% to 90% by weight of the at least one tackifier based on the total weight of the solidified adhesive spray film. In some embodiments, the solidified adhesive spray film comprises 80% to 90% by weight of the at least one tackifier based on the total weight of the solidified adhesive spray film. In some embodiments, the solidified adhesive spray film comprises 85% to 90% by weight of the at least one tackifier based on the total weight of the solidified adhesive spray film.

In some embodiments, the solidified adhesive spray film comprises 0.01% to 10% by weight of the at least one antioxidant based on the total weight of the solidified adhesive spray film. In some embodiments, the solidified adhesive spray film comprises 0.01% to 9% by weight of the at least one antioxidant based on the total weight of the solidified adhesive spray film. In some embodiments, the solidified adhesive spray film comprises 0.01% to 8% by weight of the at least one antioxidant based on the total weight of the solidified adhesive spray film. In some embodiments, the solidified adhesive spray film comprises 0.01% to 7% by weight of the at least one antioxidant based on the total weight of the solidified adhesive spray film. In some embodiments, the solidified adhesive spray film comprises 0.01% to 6% by weight of the at least one antioxidant based on the total weight of the solidified adhesive spray film. In some embodiments, the solidified adhesive spray film comprises 0.01% to 5% by weight of the at least one antioxidant based on the total weight of the solidified adhesive spray film. In some embodiments, the solidified adhesive spray film comprises 0.01% to 4% by weight of the at least one antioxidant based on the total weight of the solidified adhesive spray film. In some embodiments, the solidified adhesive spray film comprises 0.01% to 3% by weight of the at least one antioxidant based on the total weight of the solidified adhesive spray film. In some embodiments, the solidified adhesive spray film comprises 0.01% to 2% by weight of the at least one antioxidant based on the total weight of the solidified adhesive spray film. In some embodiments, the solidified adhesive spray film comprises 0.01% to 1% by weight of the at least one antioxidant based on the total weight of the solidified adhesive spray film. In some embodiments, the solidified adhesive spray film comprises 0.01% to 0.1% by weight of the at least one antioxidant based on the total weight of the solidified adhesive spray film.

In some embodiments, the solidified adhesive spray film comprises 0.1% to 10% by weight of the at least one antioxidant based on the total weight of the solidified adhesive spray film. In some embodiments, the solidified adhesive spray film comprises 2% to 10% by weight of the at least one antioxidant based on the total weight of the solidified adhesive spray film. In some embodiments, the solidified adhesive spray film comprises 3% to 10% by weight of the at least one antioxidant based on the total weight of the solidified adhesive spray film. In some embodiments, the solidified adhesive spray film comprises 4% to 10% by weight of the at least one antioxidant based on the total weight of the solidified adhesive spray film. In some embodiments, the solidified adhesive spray film comprises 5% to 10% by weight of the at least one antioxidant based on the total weight of the solidified adhesive spray film. In some embodiments, the solidified adhesive spray film comprises 6% to 10% by weight of the at least one antioxidant based on the total weight of the solidified adhesive spray film. In some embodiments, the solidified adhesive spray film comprises 7% to 10% by weight of the at least one antioxidant based on the total weight of the solidified adhesive spray film. In some embodiments, the solidified adhesive spray film comprises 8% to 10% by weight of the at least one antioxidant based on the total weight of the solidified adhesive spray film. In some embodiments, the solidified adhesive spray film comprises 9% to 10% by weight of the at least one antioxidant based on the total weight of the solidified adhesive spray film.

Example

A sprayable adhesive composition having the formulation presented in Table 1 below was prepared. Unless otherwise provided in this Example, all weight percentages are based on the total weight of the sprayable adhesive composition.

TABLE 1

| Formulation | |
| --- | --- |
| Component | Weight Percentage (%) |
| Polymers | 15% |
| Tackifiers | 30% |
| Antioxidants | <1% |
| Solvents | 30% |
| Propellants | 25% |
| Total | 100% |

The polymers, tackifiers, antioxidants, and solvent were mixed. The sprayable adhesive composition, before the propellants were added, had a viscosity of 5000 cP when measured at 25° C. using a Brookfield viscometer with a spindle #3 and a viscometer speed of 10 RPM. The various components were mixed with the propellants and a spray device was filled with the resulting sprayable adhesive composition. The sprayable adhesive composition was applied to a TPO membrane in a 2" by 6" strip and to a plywood substrate in a 2" by 6" strip. The solvent was allowed to flash off, and the TPO membrane was adhered to the plywood substrate.

What is claimed is:

1. A method comprising:
obtaining a roofing membrane;
obtaining a sprayable adhesive composition,
  wherein the sprayable adhesive composition comprises:
    at least 10% by weight at least one propellant based on a total weight of the sprayable adhesive composition;
    at least 15% by weight of at least one solvent based on a total weight of solids and the at least one solvent; and
    at least 50% by weight of the solids based on the total weight of the solids and the at least one solvent,
      wherein the solids comprise:
        at least one polymer; and
        at least one tackifier,
          wherein the at least one tackifier comprises a rosin ester;
spraying the sprayable adhesive composition onto a roofing substrate, so as to form an adhesive spray film; and
applying the roofing membrane to the roofing substrate, such that the roofing membrane is bonded to the roofing substrate by the adhesive spray film.

2. The method of claim 1, wherein the roofing membrane comprises a thermoplastic olefin (TPO) membrane, an ethylene propylene diene monomer (EPDM) membrane, a polyvinyl chloride (PVC) membrane, or a silicone membrane.

3. The method of claim 1, wherein the roofing substrate comprises a plywood substrate, an underlayment, or a roofing deck.

4. The method of claim 1, wherein the roofing membrane has a surface energy of 40 mN/m or less.

5. The method of claim 1, wherein the spraying comprises spraying the sprayable adhesive composition onto the roofing substrate so as to result in a coverage rate of at least 1000 ft$^2$ per 5 gallons of the sprayable adhesive composition.

6. The method of claim 1, wherein the spraying comprises spraying the sprayable adhesive composition onto the roofing substrate so as to result in a coverage rate of at least 2000 ft$^2$ per 5 gallons of the sprayable adhesive composition.

7. The method of claim 1, wherein the rosin ester comprises at least one of a gum rosin ester, a tall oil rosin ester, a wood rosin ester, a rosin acid ester, or any combination thereof.

8. The method of claim 1, wherein the rosin ester comprises at least one of a glycerol rosin ester, a pentaerythritol rosin ester, a hydrogenated glycerol rosin ester, a hydrogenated pentaerythritol rosin ester, or any combination thereof.

9. The method of claim 1, wherein the method does not comprise curing the adhesive spray film.

10. The method of claim 1, further comprising:

spraying the sprayable adhesive composition onto the roofing membrane, so as to form a second adhesive spray film; and applying the roofing membrane to the roofing substrate, such that the roofing membrane is further bonded to the roofing substrate by the second adhesive spray film.

\* \* \* \* \*